(12) United States Patent
Adlersberg et al.

(10) Patent No.: US 11,501,780 B2
(45) Date of Patent: Nov. 15, 2022

(54) DEVICE, SYSTEM, AND METHOD FOR MULTIMODAL RECORDING, PROCESSING, AND MODERATION OF MEETINGS

(71) Applicant: AudioCodes Ltd., Lod (IL)

(72) Inventors: Shabtai Adlersberg, Ra'anana (IL); Menachem Honig, Metar (IL); Tatiana Adar, Belle Mead, NJ (US)

(73) Assignee: AUDIOCODES LTD., Lod (IL)

( * ) Notice: Subject to any disclaimer, the term of this patent is extended or adjusted under 35 U.S.C. 154(b) by 0 days.

(21) Appl. No.: 16/877,548

(22) Filed: May 19, 2020

(65) Prior Publication Data

US 2020/0279567 A1    Sep. 3, 2020

Related U.S. Application Data

(63) Continuation-in-part of application No. 16/805,779, filed on Mar. 1, 2020, now Pat. No. 11,176,949, which is a continuation-in-part of application No. 16/260,160, filed on Jan. 29, 2019, now Pat. No. 10,963,505.

(51) Int. Cl.
*G06Q 10/10*       (2012.01)
*G10L 17/00*       (2013.01)
*G06F 16/683*      (2019.01)

(52) U.S. Cl.
CPC ........... *G10L 17/00* (2013.01); *G06F 16/685* (2019.01); *G06Q 10/10* (2013.01)

(58) Field of Classification Search
CPC ....... G10L 17/00; G06Q 10/10; G06F 16/685; G06F 40/35; G06F 40/216; G06F 40/169; G06F 40/279; G06F 40/30
See application file for complete search history.

(56) References Cited

U.S. PATENT DOCUMENTS

| | | | |
|---|---|---|---|
| 9,560,316 B1 * | 1/2017 | Lindberg | G10L 25/60 |
| 2009/0306981 A1 * | 12/2009 | Cromack | G06F 16/685 |
| | | | 704/235 |
| 2015/0310687 A1 * | 10/2015 | Morgia | G06Q 50/00 |
| | | | 705/12 |
| 2018/0101824 A1 * | 4/2018 | Nelson | H04L 12/1831 |

* cited by examiner

*Primary Examiner* — Andrey Belousov
(74) *Attorney, Agent, or Firm* — Browdy and Neimark, PLLC

(57) ABSTRACT

Devices, systems, and methods for automatic real-time moderation of meetings, by a computerized or automated moderation unit able to manage, steer and guide the meeting in real-time and able to selectively generate and convey real-time differential notifications and advice to particular participants. A Meeting Moderator Bot monitors audio conversations in a meeting, and analyzes their textual equivalent; detects topics that were skipped or that should be discussed, and notifies participants; detects double-talk or interferences and generates warnings accordingly; detects absence of participants that are relevant to particular topics; detects that the conversation should shift to another topic on the agenda; generates other meeting steering notifications; and monitors compliance of the meeting participants with such steering notifications.

19 Claims, 1 Drawing Sheet

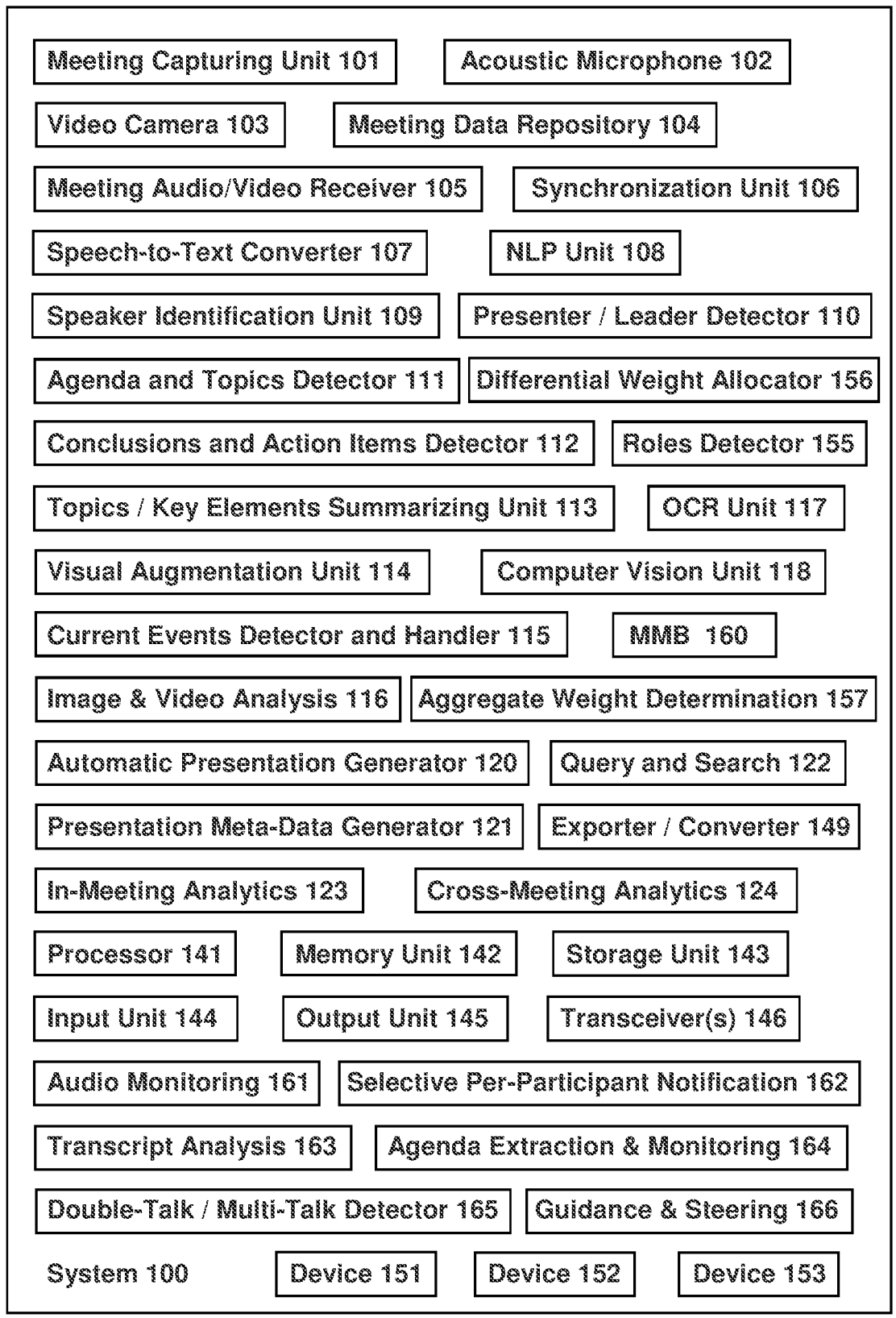

DEVICE, SYSTEM, AND METHOD FOR MULTIMODAL RECORDING, PROCESSING, AND MODERATION OF MEETINGS

CROSS-REFERENCE TO RELATED APPLICATIONS

This patent application is a Continuation-in-Part (CIP) of U.S. Ser. No. 16/805,779, filed on Mar. 1, 2020, which is hereby incorporated by reference in its entirety; which in turn is a Continuation-in-Part (CIP) of U.S. Ser. No. 16/260,160, filed on Jan. 29, 2019, which is hereby incorporated by reference in its entirety.

FIELD

The present invention is related to the field of Information Technology.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

SUMMARY

The present invention may include, for example, systems, devices, and methods for automatic real-time moderation of meetings, particularly by a computerized or automated moderation unit or moderation device able to manage and guide the meeting in real-time and/or able to selectively generate and convey real-time differential notifications and advice to particular participant(s).

For example, a Meeting Moderator Bot monitors audio conversations in a meeting, and analyzes their textual equivalent; detects topics that were skipped or that should be discussed, and notifies participants; detects double-talk or interferences and generates warnings accordingly; detects absence of participants that are relevant to particular topics; detects that the conversation should shift to another topic on the agenda; generates other meeting steering notifications; and monitors compliance of the meeting participants with such steering notifications.

The present invention may provide other and/or additional benefits or advantages.

BRIEF DESCRIPTION OF THE DRAWINGS

FIG. 1 is a schematic block-diagram illustration of a system, in accordance with some demonstrative embodiments of the present invention.

DETAILED DESCRIPTION OF SOME DEMONSTRATIVE EMBODIMENTS

The Applicants have realized that many people utilize a presentation in meetings: the presentation helps the presenter to focus on the important messages that he wants to convey or discuss, and it is also important for the other participants or the audience in order to focus on these messages and/or to remember the topics.

The Applicants have realized that a presentation may have other benefits; for example, since "a picture is worth a thousand words", adding a graphical slide, image or item to a presentation, may help the presenter to clarify a particular message, and/or may cause some of the other participants to better remember that particular message due to the accompanying picture.

The Applicants have further realized that it may be beneficial to have, at the beginning of a meeting, a written agenda of the meeting made available to the participants; and/or to have, at the end of the meeting, a summary of the topics discussed, notes and reminders taken, the conclusions reached, the decisions reached, and the action items that were allocated to participants. Such agenda in advance, and summary at the end, may contribute to the efficiency of the meeting and/or to the follow-up handling of topics discussed therein.

The Applicants have realized that numerous meetings take place, as face-to-face meetings or as phone conference meetings or as video-conference meetings, without advance preparation of a presentation, and/or without preparing or distributing in advance a written agenda of topics, and/or without preparing or distributing after the meeting a written summary or a write-up of the conclusions or decisions or action items. The Applicants have also realized that for some meetings or discussions, the meeting leader or presenter, or an appointed participant or an assistant, is tasked with manually preparing a summary of the meeting discussion, action items, decisions, or notes; however, this is a time-consuming task, and the time and effort spent by such team-member can be shifted to other, more productive, tasks that the organization may need, if the system of the present invention operates to automatically generate the summary of the meeting or discussion instead of leaving this task to a human team-member.

The Applicants have also realized that in many meetings, the presenter or one or more of the participants may convey an interesting idea, which then gets lost or forgotten in the general conversation without being reflected in an already-written presentation that was prepared in advance for the meeting, and without being reflected in a summary of conclusions or decisions that was manually prepared regarding the meeting.

The Applicants have further realized that an automatic generation of a visual presentation, with regard to a meeting or a discussion that took place, may later assist the participants and/or the presenters and/or third parties (e.g., co-workers, legal department, accounting department, or the like) to capture the essence of the meeting and to follow-up on the performance and completion of action items that were discussed or presented at such meeting. Moreover, the automatic insertion or inclusion of graphical items (e.g., images, photographs, designed logos, or the like), into such automatically-generated presentation, may further assist such users in remembering key elements from the meeting and/or in focusing such users on specific points or items that were presented or discussed.

The present invention provides systems and method that may utilize, for example, voice transcription (speech to text engine), speaker identification, textual/contextual analysis, Natural Language Processing (NLP) or Natural Language Understanding (NLU), automatic retrieval of additional information from the Internet and/or from a local repository (e.g., an organizational or enterprise repository) and/or from third-party databases, as well as artificial intelligence (AI) and/or other functionalities, in order to determine and analyze "who said what" in a meeting or a discussion or a presentation, and to generate a visual presentation that includes textual and/or graphical components that correspond to key elements that were discussed or presented, and/or that further expand on such key elements; thereby analyzing what was said or discussed in a meeting, and automatically generating from it a visual layer that corresponds to it.

Some embodiments may automatically create, in an autonomous or artificial manner, a "post mortem" presentation that corresponds to the meeting or the discussion, as if the presenter and/or the participants would have created such presentation before the meeting or before the discussion; and optionally also including within such presentation additional materials or ideas or to-do items or action items that were discussed or presented in the meeting (or discussion) without necessarily being planned in advance by the presenter, thereby generating a visual presentation that may be, in some situation, even better in its quality than a presentation that was prepared in advance prior to the meeting and which does not necessarily reflect the actual discussion in the meeting, or that misses or lacks important portions that were discussed in the meeting without necessarily being planned ahead as discussion points. Such automatically-generated presentation may include multiple components or slides or pages or chapters; for example, a subject or title or main topic of the meeting; an agenda of topics and sub-topics discussed; a textual and/or visual portion that corresponds to each topic/sub-topic as discussed; decisions and conclusions; action items or "to do" items, or allocation of tasks to particular persons or entities; summary; questions that need to be further researched or answered; data and meta-data about the meeting (e.g., list of participants; list of active participants who talked; list of silent participant who attended but did not talk; name of presenter(s); date and time of the meeting; date and time, or time-slots, in which each participant talks; talking time of each participant; aggregate talking time of all participants; relative ratio of talking times of participants (e.g., participant Adam talked during 40% of the meeting length, whereas participant Bob talked during 5% of the meeting length); identification of order or repeating order of talking (e.g., automatic identification that participant Adam, in 90 percent of his talks, has talked immediately after participant Bob; or other data or analyzed data regarding talking time of participants in the meeting or the discussion); or the like.

Such data may be automatically generated and organized in a searchable format, which enables the organization or users to later retrieve and search through the data; such as, by utilizing search queries of "show me the presentations for all meetings that discussed the MeetingInsights Product", or "show me all the slides in this presentation that refer to the MeetingInsights Product", or "show me all slides or portions in this presentation that reflect input or utterances by participant John Smith", or "show me all action items from all meetings that took place in November 2018 and that mentioned at least once the MeetingInsights Product", or the like; and the system may parse such or similar queries, may search the data and/or meta-data of automatically-generated presentations, and may output the relevant portions or slides from the relevant presentation(s); thereby making use of past meetings, of past discussion, and of the automatically-generated presentations that correspond to them.

The system may automatically add visual, textual and/or graphical content from external sources that are external to the meeting itself; for example, if the meeting included a discussion of a recent real-world event (e.g., hurricane in Florida; or municipal elections in Los Angeles), then the system may automatically obtain text and/or graphics and/or content-items (e.g., including also news articles, or hyperlinks to news articles) that correspond to such that event(s) and/or that provide additional data about such events. Similarly, if a particular corporation or organization or person was discussed (e.g., at least one time during the meeting, or at least N times during the meeting), then the automatically-generated presentation may further comprise a graphical item of the logo of that corporation or organization, or of the image of that person, or the like. Such automatically-generated visual items serve not only in order to beautify the generated presentation, but rather, they also serve as attention-grabbing content-items that may assist a user to consume, understand and/or remember the relevant portions of the meeting and/or to act on them and/or to focus the user's attention on particular elements in the meeting, thereby assisting users to later review the meeting content in a useful and efficient manner, and/or assisting users to memorize such content and/or to process it more efficiently.

Some embodiments of the present invention may automatically generate "from scratch" a comprehensive, visual, presentation that corresponds to a meeting or discussion that took place, without the need to provide to the system any slide(s) or content other than an audio recording or an audio input from the meeting, which the system then autonomously analyzes. Other embodiments may utilize some, or all, of a previously-prepared presentation that may have been prepared for the meeting, and may revise or expand or modify such previously-prepared presentation in order to make it reflect the actual discussions that took place in real-life in the meeting, and/or may add new slides or artificial slides to such presentation, or may augment or modify the content of particular slide(s) of the previously-prepared presentation.

The terms "meeting" or "discussion" as used herein may include, for example, a face-to-face meeting, a telephonic meeting, a telephone conference call, a video meeting, a video conference call, a hybrid or mixed meeting in which one or more users participate in person and/or one or more other users participate via telephone and/or one or more other users participate via video conferencing and/or one or more other users participate via other means (e.g., via a messaging application or a chat application), or the like.

Reference is made to FIG. 1, which is a schematic block diagram illustration of a system 100, in accordance with some demonstrative embodiments of the present invention.

System 100 may comprise a Meeting Capturing Unit 101, able to capture and/or record and/or acquire audio and/or video and/or audio-video of a meeting. For example, an acoustic microphone 102 may capture audio of a meeting; and optionally, a video camera 103 or imager may capture video or audio-and-video of a meeting or an audio conferencing or video conferencing. The captured audio/video data may be stored in a Meeting Data Repository 104. Additionally or alternatively, such audio and/or video may be received from an external source, such as, from a teleconferencing service that is operated by a third party; for example, a Meeting Audio/Video Receiver 105 may receive audio/video of such meeting from the external source or from the third-party, and may store it (in its original format, or after being reformatted) in the Meeting Data Repository 104.

In some embodiments, audio/video data of a single meeting may reach the Meeting Data Repository 104 from multiple sources, for example, from an audio microphone that recorded the meeting within a conference room in which several participants have attended in person, as well as from a tele-conferencing service or a "telephonic bridge" service which provided a telephonic bridge or a teleconferencing service or a video-conference service to some other participants in that meeting that did not attend the conference room in person but rather have attended the meeting remotely via such remote access tools.

A synchronization unit 106 may perform initial analysis of the audio and/or video data from all sources, and may normalize the data or may determine the overlapping and/or the non-overlapping portions of such multiple data streams or data sources. For example, the synchronization unit 106 may analyze the data and may detect that the acoustic microphone within the conference room has provided an audio recording of the entire meeting from 11:00 AM until 11:45 AM; whereas, the tele-conferencing service has provided an audio recording of almost (but not all) of the entire meeting, from 11:03 AM until 11:42 AM. The synchronization unit 106 may thus detect that there may be some meeting-portions that are reflected only in the audio captured by the local microphone within the conference room, and that are not reflected in the tele-conference recorded audio. The synchronization unit 106 may optionally flag or otherwise notify this scenario to other components of the system, to notify or to alert them that there are non-overlapping portions of the meeting that exist only in a particular source and not in other source(s) of audio and/or video.

A speech-to-text converter 107 may process all the audio from all sources, and may generate a textual transcript of the discussions held in the meeting. Optionally, a Natural Language Processing (NLP) unit 108 may perform initial analysis or the transcript, in order to improve it and/or to fine-tune it or to remove ambiguities or to make corrections and/or detect the intent in a phrase and fill the slots in such an intent based on a pre-configured intent structure, its key slots, and format. For example, participant Adam said during the meeting "we need two cars for this project"; the speech-to-text converter 107 may initially transcribe this phrase as "we need to cars for this project"; and the NLP unit 108 may then fine-tune and correct this to be "we need two cars for this project" based on an NLP analysis that detects the plural form "cars" after the word "two", and that selects it to be "two" rather than "to" or "too".

A speaker identification unit 109 may further analyze the audio/video data, and/or the generated transcript, and/or other meta-data; and may identify that a particular participant has spoken at particular time-slots; and may tag or mark his utterances or his audio-portions as belonging to him. In some embodiments, the speaker identification may be based on contextual analysis of content; for example, if Participant A said "I often ask myself, James, how can we fix this problem?", then the speaker identification unit 109 may determine that Participant A is James. Similarly, if Participant B said "What do you, Bob, think about this?", and then Participant C says "Well, Rachel, this is a great question", then the speaker identification unit 109 may determine that Participant B is Rachel and that Participant C is Bob. In another example, the audio recording of the meeting may be correlated with data from a scheduling application or a calendar application, in order to obtain data or meta-data that can be used for speaker identification; for example, the calendar entry for the Northern Conference Room may show a meeting that took place from 11:00 AM to 11:45 AM, with participants "Rachel, Bob, James"; the speaker identification unit 109 may identify a female voice based on a higher frequency or higher pitch of utterances, or based on contextual analysis (e.g., a participant responds with "I think she is right in which she has just said"), thereby determining that a particular participant is female, and correlating this determination with calendar/scheduling data in order to deduce that this female participant is Rachel. The speaker identification unit 109 may augment or modify the transcript of the meeting, by adding to it the actual names of participants; or, at least, by adding to the transcript generic place-holders such as "Participant A" and "Participant B" and "Participant C" if they real names cannot be deduced based on the current data.

The speaker identification unit 109 may further utilize a Presenter/Leader Detector 110 to determine which participant is the presenter or leader of the meeting; for example, based on contextual analysis of audio (e.g., the first participant who talked and said "I have initiated this meeting in order to discuss our goals", is thus identified as the Presenter/Leader of the meeting), and/or based on meta-data such as the length of time that each participant talked (e.g., Participant A has talked 80 percent of the meeting; Participant B has talked 12 percent of the meeting; Participant C has talked 8 percent of the meeting; therefore Participant A is determined to be the presenter/leader of that meeting). The speaker identification unit 109 may be used to improve the accuracy of the speech to text function by running speaker dependent speech to text algorithm, instead of speaker independent (or speaker agnostic) speech to text algorithm.

An Agenda and Topics Detector 111 analyzes the transcript of the meeting and/or other data or meta-data, in order to extract or determine the planned agenda that is presented and/or the topics (and sub-topics) that are discussed. For example, an NLP unit may analyze the transcript, and may identify the agenda based on a phrase that Participant B said within the first N minutes (e.g., within the first 3 minutes) of the meeting, such as, "The purpose of this meeting is to discuss how to market our MeetingInsights Product in Europe"; and may thus determine the Agenda of that meeting to be "Marketing the MeetingInsights Product in Europe". Similarly, a textual or contextual analysis of the transcript by the Agenda and Topics Detector 111 may detect a phrase such as "We now turn to discuss the budget that would be required in year 2019 for this marketing campaign" at time-point 11:27 AM, and may further detect the words "budget" and "marketing campaign" uttered several more times between 11:27 AM to 11:32 AM, thereby leading the Agenda and Topics Detector 111 to determine that a topic of "Budget for Marketing Campaign" was discussed at the time-slot of 11:27 AM to 11:32 AM. Optionally, the Agenda and Topics Detector 111 may utilize other sources in order to reach such determinations; for example, by retrieving the meeting data from a scheduler application or a calendar application that showed the meeting as being titled "Meeting to discuss the 2019 marketing campaign of the MeetingInsights Product in Europe".

Similarly, a Conclusions and Action Items Detector 112 (or, in some implementations, a Detector Unit for conclusions, action items, notes and/or reminders) may analyze the transcript of the meeting, as well as other sources of information, in order to deduce and/or determine any conclusions, decisions, and/or action-items or "to do" items that were discussed or concluded in the meeting. For example, the Conclusions and Action Items Detector 112 may determine an action item based on detecting in the meeting transcript an utterance of "As a third action item, James will research the cost of television ads in France"; or may determine a conclusion or a decision by detecting an utterance of "In conclusion, we decide not to advertise the MeetingInsights Product in sports magazines in Spain".

Optionally, the Conclusions and Action Items Detector 112 may fetch or obtain data from other sources, such as, from a project management software of the organization, which may already be updated with such action items or "to do" items that were manually created by one or more of the participants; and may inject or add or insert such action items obtained from that resource into the presentation that is being automatically generated for that meeting. The system of the present invention may thus insert, into an automatically-generated presentation of a particular meeting, one or more action items or "to do" items that are obtained from a scheduling application or a calendar application or a project management application or a tasks allocation application, even though such external data was not necessarily already available during the meeting itself.

A Topics/Key Elements Summarizing Unit 113 further analyzes the transcript, optionally by utilizing Artificial Intelligence (AI) and/or Machine Learning (ML) techniques, in order to generate a summary and/or key elements of each topic that was discussed in the meeting. For example, an analysis of the transcript may indicate to the system that "budget" or "marketing campaign in Europe" was discussed from 11:27 AM until 11:32 AM; and that Participant A has spoken 60 percent of that time-slot, and mentioned in his spoken utterances "we have a first option, which is" and also "there is a second option, which is"; and may generate a summary along the line of "Participant A has presented two options for the marketing campaign in Europe, which were discussed from 11:27 AM to 11:32 AM".

A Visual Augmentation Unit 114 may analyze the transcript in order to detect particular words or phrases or names that can and/or should be augmented with a visual content-item, such as graphics or image or photograph or animation. For example, repeated utterances in the meeting regarding the marketing campaign in "France", may trigger the Visual Augmentation Unit 114 to obtain an image of the map of France or of the flag of France or of an item or monument that is typically associated with France (e.g., an image of the Eiffel Tower; an image of a French bread or "baguette"); and to generate a notification that this visual component should be added, automatically, by the system to the slide or portion of the presentation that are associated with the "marketing campaign in France". Similarly, the Visual Augmentation Unit 114 may detect that a portion of the meeting has repeatedly mentioned "Senator Bob Smith", and may obtain from the Internet an image of that person (e.g., via an Image Search through a search engine), in order to augment the generated presentation with such image in the relevant portions or slides that refer to that person. Similarly, the Visual Augmentation Unit 114 may detect that a portion of the meeting had a four-minute discussion about "how can we market our MeetingInsights Product to Big-Corp"; and may obtain from the Internet an image of the logo of that corporation (Big-Corp), via an Image Search through a search engine, in order to augment the generated presentation with such image in the relevant portions or slides that refer to that corporation.

Similarly, the Visual Augmentation Unit 114 may be configured to automatically detect in the transcript positive/success indicators (e.g., an utterance such as "this was a great achievement", or an utterance of "I am glad to report that sales have tripled during the last quarter"), and to obtain from a repository or from the Internet visual content item(s) that correspond to such positive/success indicators (e.g., an arrow pointing upward; a graph showing growth; a gold medal). Similarly, the Visual Augmentation Unit 114 may be configured to automatically detect in the transcript negative/problem indicators (e.g., an utterance such as "we failed to market our product in Germany", or an utterance of "I am sad to update that our sales have decreased in half during the last quarter"), and to obtain from a repository or from the Internet visual content item(s) that correspond to such negative/failure indicators (e.g., an arrow pointing down; a graph showing decline).

A Current Events Detector and Handler 115 operates to detect in the transcript references to particular current event(s), which many meetings may include, and which often do not appear in a presentation that was prepared in advance of a meeting (if at all such presentation was prepared or would have been prepared). For example, the Current Events Detector and Handler 115 may detect multiple utterances by multiple participants, which referred to "the hurricane in Florida" or to the "municipal elections in Los Angeles"; may identify this as a current event, for example, based on an Internet search that is focused on News Items (e.g., detecting that the phrase "hurricane in Florida" has at least N search results (e.g., at least 50 search results) from the past D days (e.g., from the three days prior to the meeting date) in the News section of a search engine. The Current Events Detector and Handler 115 may then proceed to obtain from the Internet a content item about that news event, such as an article or an image that corresponds to that event; and to add such text or image or content item to the presentation being generated, or to add a hyperlink to such external content item to the presentation being generated.

Optionally, an Image & Video Analysis Unit 116 may analyze images and/or video that were captured or recorded or acquired as part of the meeting; for example, by a photo or video camera, by a fixed or mobile projector or a projecting device or system, by a slides presentation device, by a "smart board" or computerized board or blackboard or presentation board, by a computing device that can take or save screenshots of shown images, or the like. The images/video of the meeting, or portions thereof, may be analyzed by using one or more processing techniques; and the results of such processing, as well as associated data or content that may be generated or fetched from other sources, may then be incorporated into the automatically-generated presentation.

For example, an Optical Character Recognition (OCR) Unit 117 may perform OCR on captured images or video-frame(s), such as a video-frame showing the content that the presenting person had written on a smart-board or a regular board during the discussion, and may identify that he wrote "Problem: reduced profit" and "Solution: increase our marketing budget", and may extract these words as textual elements (and/or as images or image-portions) and they may be included or incorporated into the automatically-generated meeting summary.

Additionally or alternatively, a Computer Vision Unit 118 may apply a computer vision algorithm to such captured images and/or videos and/or video-frames, and may identify or recognize objects or items that are shown or presented during the meeting; for example, the meeting leader may hold a product (e.g., a box of cereal) in his hand and may describe verbally the marketing efforts that were done by the organization to market that product, and the Computer Vision Unit 118 may analyze the relevant images or video-segments or video-frames (e.g., optionally by detecting which images or video-portions are associated with the particular audio-segment that talks about that product), and may identify the product held by the speaker using computer vision, and may incorporate into the automatically-generated presentation an image of that product (e.g., extracted from the video frame; or, a higher-quality image of that product as obtained from the Internet via an image search or via a search engine, or as obtained from an internal or external repository of images or from an image-bank service).

In another example, the Image & Video Analysis Unit 116 may detect an image or a video-frame which shows an Agenda or a "list of topics" or a "to-do list" or an "action items" list, that were presented or shown during the meeting; may extract from them the relevant textual components (e.g., via OCR, or by Computer Vision); and may incorporate or add such content into the automatically-generated presentation; thereby creating automatically an Agenda slide, or a "list of topics" or "table of contents" slide, or a "summary/conclusion" slide, or a "to-do list" or "action items" slide; or thereby adding materials and text and/or images into such type(s) of automatically-generated slide(s) of the presentation that is being generated. Such content may not necessarily be available as part of the meta-data of the meeting (e.g., in the Invitation to the meeting via a calendar application or a scheduling application), yet the system may obtain and extract such data, as described, from images and/or video-portions or screen-shots that were captured during the meeting. Similarly, portions of such images or video-segments may be automatically embedded into, or inserted into, the automatically-generated presentation, in addition to (or instead of) the extracted textual content.

In some embodiments, an In-Meeting Analytics Unit 123 may analyze the data and meta-data that is available to the system and/or that was generated or processed by the system, and may generate in-meeting analytics or insights that pertain to a single particular meeting; for example: each topic/sub-topic as discussed; decisions and conclusions; action items or "to do" items, or allocation of tasks to particular persons or entities; summary; questions that need to be further researched or answered; data and meta-data about the meeting (e.g., list of participants; list of active participants who talked; list of silent participant who attended but did not talk; name of presenter(s); date and time of the meeting; date and time, or time-slots, in which each participant talks; talking time of each participant; aggregate talking time of all participants; relative ratio of talking times of participants (e.g., participant Adam talked during 40% of the meeting length, whereas participant Bob talked during 5% of the meeting length); identification of an order or a repeating order of talking (e.g., automatic identification that participant Adam, in 90 percent of his talks, has talked immediately after participant Bob; or other data or analyzed data regarding talking time of participants in the meeting or the discussion); or the like. Such data and insights may further be processed in order to be included (e.g., in textual format; or as images or visual representation, such as, an automatically-generated Pie Chart of Bar Chart that shows the talk time of each participant in that meeting) in the automatically-generated presentation that summarizes the meeting, and/or to be included as an external log or file or meta-data about the meeting, and/or to be accessible for searching and querying as described.

Similarly, in some embodiments, a Cross-Meeting Analytics Unit 124 may analyze the data and meta-data that is available to the system and/or that was generated or processed by the system, and may generate cross-meeting analytics or insights that pertain to multiple meetings in the aggregate; for example: each topic/sub-topic as discussed in such multiple meetings; a list of topics that were discussed in all the meetings; a list of topics that were discussed on only a single meeting; decisions and conclusions; action items or "to do" items, or allocation of tasks to particular persons or entities; summary; questions that need to be further researched or answered; data and meta-data about the meeting (e.g., list of participants; list of active participants who talked; list of silent participant who attended but did not talk; name of presenter(s); date and time of the meeting; date and time, or time-slots, in which each participant talks; talking time of each participant; aggregate talking time of all participants; relative ratio of talking times of participants (e.g., participant Adam talked during 40% of the meetings length, whereas participant Bob talked during 5% of the meetings length); identification of an order or a repeating order of talking (e.g., automatic identification that participant Adam, in 90 percent of his talks, has talked immediately after participant Bob; or other data or analyzed data regarding talking time of participants in the meeting or the discussion); or the like. The analysis may be performed relative to the aggregated data across multiple meetings; for example, thereby identifying and detecting that in multiple meetings, user Adam typically talks immediately after user Bob, or determining that across multiple meetings user Charles talks on average 45% of the meeting length, or the like. Such data and insights may further be processed in order to be included (e.g., in textual format; or as images or visual representation, such as, an automatically-generated Pie Chart of Bar Chart that shows the talk time of each participant in that meeting) in one or more of the automatically-generated presentation(s) that summarizes the meetings, and/or to be included as an external log or file or meta-data about the meeting(s), and/or to be accessible for searching and querying as described. In some embodiments, the cross-meeting analysis may be performed by the system, on demand, with regard to a subset of the meetings; such as, "run the cross-meeting analysis regarding all the meetings that took place in 2018", or "run the cross-meeting analysis regarding all the meetings that took place in August 2018 and that Adam participated in them", or "run the cross-meeting analysis regarding all the meetings in 2017 that discussed the topic of Budget", or the like In some embodiments, the Cross-Meeting Analytics Unit 124 may further generate insights with regard to related meetings correlation (e.g., recurrent, events) performance metrics. For example, the system may analyze and generate insights with regard to recurrent meeting AI execution time (e.g., or other performance metrics); and may indicate, for example, that current and/or previous AI execution time for a previously-processed meeting and/or for a currently-processed meeting; and optionally showing or presenting such cross-meeting data or insights side-by-side or using a Bar Chart or a Pie Chart or other visual representation.

An Automatic Presentation Generator 120 may collect the data and/or content items that was generated or detected or prepared by the other components, and may generate or create a presentation that corresponds to the meeting. For example, the Automatic Presentation Generator 120 may generate a slide with the Title of the meeting; a slide with the Agenda or Topic List of the meeting; multiple slides with summaries of each topics or sub-topics; a slide with conclusions and decisions; a slide with action items or "to do" items"; a slide with meta-data about the meeting (names and type of participants; name and role of presented/leader; time-slot of the meeting; time-slots in which each user participated; means of participation by each user). Optionally, at least one of the generated slides, or at least some of the generated slides, may comprise augmented content-item(s), such as an image of a person or a place that was discussed, or a visual or graphical content-item that corresponds to failure or success or to positive or negative indicators, or a hyperlink to a current event, or a brief description of image of a current event, or other augmented content.

The Automatic Presentation Generator 120 may operate in conjunction with a presentation meta-data generator 121, able to generate meta-data or links or tags or pointers that may be associated with particular portions of the generated presentation, and/or which may enable efficient and user-friendly searching or querying of the generated presentation. For example, an automatically-generated slide of "Action Items", may comprise three bullet-point textual phrases that correspond to three Action Items that were detected; and each of those bullet-point items may contain a hyperlink or a button or a pointer that, if engaged by the user who views the presentation, cause the system to playback the particular audio portion (and/or video portion) that corresponds to the discussion of that particular action item. Similarly, a Conclusion in the Conclusions Slide may be linked to the particular time-slot in the audio recording of the meeting, in which the presenter summarizes the conclusions of the meeting.

A query and search unit 122 may enable a user to submit queries, that are then parsed by the system in order to retrieve and display (or play-back) the particular presentations and/or the particular presentation-portions or slide(s) that match such queries. For example, the query and search unit 122 may present a free-text query field, or an advanced search interrace that utilizes multiple fields and Boolean operators (e.g., "Agenda=Marketing" and "Participants=Rachel" and "Date=in 2018"; or, "Date=in November 2018" and "Action Items allocated to =Rachel"). The query and search unit 122 may analyze the automatically-generated presentation(s) or slides, and/or the original transcript of the meeting or discussion, in order to generate the search results and to make them accessible for viewing/consumption by the querying user.

The above-mentioned units or modules of the system may be implemented using, for example, a Processor 141, a Memory Unit 142, a Storage Unit 143, an Input Unit 144 (e.g., keyboard, keypad, touch-screen, microphone, mouse, touch-pad, smart-board), an Output Unit 145 (e.g., screen, touch-screen, projector, display unit, monitor, television, audio speakers), one or more transceivers 146 (e.g., Wi-Fi transceiver, cellular transceiver, Bluetooth transceiver), one or more wired and/or wireless communication modules (e.g., Network Interface Card (NIC), network adapter, modem), and/or other suitable hardware components and/or software components. Optionally, an Exporter/Converter Unit 149 may export of convert the automatically-generated presentation (and/or other insights or data or meta-data) into one or more suitable formats or file structures or data structures, for example, as a PowerPoint presentation file, as a Microsoft Word file, as a Microsoft Excel file, as a PDF file, as a Comma Separated Values (CSV) file, or the like.

In some embodiments, a method comprises: obtaining or capturing or receiving an audio recording of a meeting; obtaining or generating or receiving a transcript of said meeting from said audio recording; automatically generating a visual presentation that corresponds to particular key elements in said meeting. Key Elements of the meeting may include one or more of the above-discussed data-items, such as, agenda, topics, conclusions, action-items, to-do list, participants, meeting meta-data, participants, leader, topics, or the like.

In some embodiments, the method comprises: based on textual analysis of said transcript, determining a main topic of said meeting; and generating a slide in said visual presentation that comprises said main topic.

In some embodiments, the method comprises: based on analysis of meeting scheduling data, determining a main topic of said meeting; and generating a slide in said visual presentation that comprises said main topic.

In some embodiments, the method comprises: determining at least one topic that was discussed in said meeting, based on textual analysis of said transcript; generating a slide in said visual presentation that comprises said topic, and further comprises a textual summary of utterances about said topic in said meeting; and inserting the slide into an appropriate or contextually-relevant or suitable place in the meeting.

In some embodiments, the method comprises: determining at least one topic that was discussed in said meeting, based on analysis of scheduling data of said meeting; generating a slide in said visual presentation that comprises said topic, and further comprises a textual summary of utterances about said topic in said meeting.

In some embodiments, the method comprises: based on textual analysis of said meeting, determining at least one conclusion that was conclude in said meeting; generating a slide in said visual presentation that comprises said conclusion.

In some embodiments, the method comprises: based on textual analysis of said meeting, determining at least one action item that was allocated in said meeting; generating a slide in said visual presentation that comprises said action item.

In some embodiments, the method comprises: detecting a correlation between (i) a portion of the transcript of the meeting that discussed a particular action item, and (ii) data of an application that manages allocated action items; based on said correlation, determining that said particular action item was allocated in said meeting; generating a slide in said visual presentation that comprises said particular action item.

In some embodiments, the method comprises: based on textual analysis of said meeting, determining at least one person that was discussed in said meeting; obtaining from a repository an image of said person; generating a slide in said visual presentation that comprises at least said image of said person.

In some embodiments, the method comprises: based on textual analysis of said meeting, determining at least one corporation that was discussed in said meeting; obtaining from a repository an image of a logo of said corporation; generating a slide in said visual presentation that comprises at least said image of said logo of said corporation.

In some embodiments, the method comprises: based on textual analysis of said meeting, determining at least one product that was discussed in said meeting; obtaining from a repository an image of said product; generating a slide in said visual presentation that comprises at least said image of said product.

In some embodiments, the method comprises: based on textual analysis of said meeting, determining at least one geographical location that was discussed in said meeting; obtaining from a repository an image of said geographical location; generating a slide in said visual presentation that comprises at least said image of said geographical location. Some embodiments may obtain, generate and/or utilize statistics with regard to data that is important for better analysis of the meeting In some embodiments, the method comprises: based on textual analysis of said meeting, determining a recent news event that was discussed in said meeting; obtaining from a repository an image that corresponds to said recent news event; generating a slide in said visual presentation that comprises at least said image of said recent news event.

In some embodiments, the method comprises: based on textual analysis of said meeting, determining a recent news event that was discussed in said meeting; obtaining from a repository a hyperlink to a news article about said recent news event; generating a slide in said visual presentation that comprises at least said hyperlink to the news article about said recent news event.

In some embodiments, the method comprises: determining a real-life identity of a presenter of said meeting; generating a slide in said visual presentation that comprises at least said real-life identity of said presenter of said meeting.

In some embodiments, the method comprises: generating a plurality of slides in said visual presentation, wherein a first slide comprises: (i) a summary of a first topic, and (ii) a first User Interface element that, when engaged, causes the method to play-back a first portion of an audio recording of said meeting that corresponds to said first topic; wherein a second slide comprises: (i) a summary of a second topic, and (ii) a second User Interface element that, when engaged, causes the method to play-back a second portion of the audio recording of said meeting that corresponds to said second topic.

In some embodiments, the method comprises: generating a plurality of slides in said visual presentation, wherein a first slide comprises: (i) a summary of a first topic, and (ii) a first User Interface element that, when engaged, causes the method to display a first portion of the transcript of said meeting that corresponds to said first topic; wherein a second slide comprises: (i) a summary of a second topic, and (ii) a second User Interface element that, when engaged, causes the method to display a second portion of the transcript of said meeting that corresponds to said second topic.

In some embodiments, the method comprises: receiving a request to find a meeting-portion that corresponds to criteria indicated in a particular search query; performing a search through data and meta-data of said visual presentation, based on said criteria; displaying to a user a particular slide of the visual presentation, which corresponds to the meeting-portion that corresponds to said criteria that were indicated in said particular search query.

Some embodiments may comprise a non-transitory storage medium having stored thereon instructions that, when executed by a hardware processor, cause the hardware processor to perform a method as described above.

Some embodiments may comprise an apparatus comprising a hardware processor configured to perform a method as described above.

In accordance with the present invention, system 100 may comprise several end-user devices which may be utilized by users to participate or to attend a meeting. For demonstrative purposes, three such end-user devices are shown in FIG. 1, as devices 151-153; although there may be other number of participants and respective devices. For example, device 151 may be a smartphone of User Adam; device 152 may be a tablet of User Bob; and device 153 may be a laptop computer of User Carla. Each one of such devices may be equipped with an acoustic microphone able to capture the audio spoken by the respective participant; as well as one or more audio speakers or headphones or earphones able to produce sounds and audio of the meeting (e.g., speech and audio originating from the other participants).

System 100 may operate to determine and to allocate Differential Weight to the audio input provided by each participant, based on one or more pre-defined conditions or rules or parameters (e.g., based on pre-defined organizational preferences, and/or by allocating greater weight according to speaker's title or position or role); and may then utilize the differential weight in order to determine that a particular meeting-portion corresponds to an Accepted Decision or to a Decided Action Item, or conversely, corresponds to a Rejected Suggestion or to a Rejected Proposal.

In a demonstrative embodiment, system 100 may obtain and/or may deduce and/or may determine autonomously, information about the corporate role of each participant in the meeting, and/or other information relevant to the process of assigning differential weight to participants' inputs. For example, a Roles Detector Unit 155 may determine that User Adam is the CEO of the organization, by analyzing the email invitation that corresponds to the meeting, and extracting from it the list of participants which included the string "Adam Brown—CEO", and performing a string analysis using NLP algorithms and/or textual analysis and/or contextual analysis to determine that User Adam is the CEO. Similarly, the Roles Detector Unit 155 may determine that User Bob is a junior assistant, based on a textual analysis of emails that led to scheduling this meeting, by analyzing such emails and detecting the phrase "Bob will attend the meeting as an assistant to take notes", and by extracting or deducing the role of User Bob accordingly. Similarly, the Roles Detector Unit 155 may determine that User Carla is the CTO of the organization, based on her email signature which reads "Carla Gold, CTO".

Additionally or alternatively, the Roles Detector Unit 155 may request from each participant (e.g., when he joins the meeting, or prior to his joining the meeting, or during the meeting, or even upon completion of the meeting) to indicate explicitly his role in the organization and/or in the meeting; such that, for example, User Adam may utilize his device 151 to indicate explicitly that he is CEO, while User Bob may utilize his device 152 to indicate that he is the Assistant.

Additionally or alternatively, the Roles Detector Unit 155 may request from one particular participant, or from a meeting organizer (e.g., the user who organized or created the meeting, and/or who invited other participants to the meeting), to explicitly identify and indicate the role of each participant (e.g., when such organizer creates or organizes the meeting; or when he joins the meeting, or prior to his joining the meeting, or during the meeting, or even upon completion of the meeting); thereby allowing the meeting organizer (e.g., and only him) to define roles for each participant. For example, a meeting organizing tool or a meeting creating tool, may enable the organizing user to invite other users to the meeting, while also allowing him to designate or indicate the title or the role of each such invitee or participant.

Additionally or alternatively, the Roles Detector Unit 155 may estimate such roles of each participant, and may present the estimated roles for the review of a particular user (e.g., the meeting organizer) in order to obtain his approval or modifications or corrections; or, may present to each participant the deduced role or the estimated role that the system estimated for him and may request his approval or his modifications or correction (e.g., when he joins the meeting, or prior to his joining the meeting, or during the meeting, or even upon completion of the meeting). For example, the Roles Detector Unit 155 may deduce, from emails or from the data or meta-data of the meeting scheduling, that User Adam is the CEO; and may present to User Adam, as he joins the meeting (or during the meeting, or even after the meeting) an inquiry, "Are you indeed the CEO? Please confirm or modify your role", thereby allowing User Adam to confirm his role, or conversely to modify or correct it. Optionally, instead of posing the question to each one of the participants, the questions may be posed to the meeting organizer, who may confirm or correct the roles of each participant.

In some embodiments, the Roles Detector Unit 155 may deduce or estimate the role of a participant, based on textual and/or contextual analysis of data or meta-data, and may also utilize textual analysis and/or NLP analysis of the transcript of the meeting. For example, the transcript of the meeting may include a phrase that User Bob said, "Guys, I think that Adam as our CEO should decide on this important matter"; and may deduce from that transcript segment that the role of User Adam is CEO. In some implementations, the Roles Detector Unit 155 may deduce or estimate or determine the role of a participant by analyzing the text or the content of a presentation or slides (e.g., a PowerPoint presentation) that was presented in the meeting, and/or was shared or was otherwise associated with a meeting; for example, since Slide 6 in that presentation mentions that "Carla as CTO will describe the company's revenue stream", thereby enabling the Roles Detector Unit 155 to determine that Carla is the CTO.

In some embodiments, the Roles Detector Unit 155 may optionally utilize a pre-defined lookup table, or company director or organization directory, or an organizational chart or an "org chart", which may list or otherwise indicate or show the names and/or titles and/or roles of personnel or key persons in the company. For example, a single person on behalf of the entire organization (e.g., Human Resources manager) may prepare, upload and/or share with system 100 such an organizational chart or an organizational directory of persons, with their names and titles; and the Roles Detector Unit 155 may thus perform a lookup inquiry in order to match between the meeting participant "Adam Brown" and his corresponding role or title "CEO" in the organizational chart or corporate directory.

In some embodiments, optionally, the system may autonomously import or determine such chart, based on analysis of a website or a web-page that belongs to the organization. For example, the meeting may include User Adam, who was invited to participate via an email that was sent to "Adam.Brown@Company.com". The Roles Detector Unit 155 may autonomously access the website "Company.com", and may crawl and/or download the website or portions thereof; and particularly, may be configured to search for web-pages that are titled "Our Team" or "Our Management" or "About Us", and may perform textual analysis and/or NLP analysis of such web-pages and website content in order to determine that "Adam Brown" is the "CEO" of that "Company.com", based on textual analysis or NLP analysis of the "Our Management" web-page on that website. Optionally, such determined roles may be brought to the attention of the meeting organizer, or to the attention of each participant in the meeting or some participants, for their approval or for their correction or modification.

In accordance with the present invention, a Differential Weight Allocator Unit 156 may operate to allocate or assign or determine a different weight, to transcript segments or transcript portions or other data-items that are associated with different roles or different participants in the same meeting. In a demonstrative embodiment, a lookup table may be used to indicate that items that were said or uttered by the CEO of the organization, should be associated with 50 points; that items that were said or uttered by the CTO or CFO of the organization, should be associated with 28 points; and that items that were said or uttered by a Junior Assistant should be associated with 1 point. In some embodiments, the lookup table may match between roles or titles (e.g., CEO, CFO, project manager, assistant) and the respective weight that should be assigned to segments that they said (e.g., indicated by points, or by a percentage value, or by other numerical value or quantitative indicator). In other embodiments, the lookup table may match between names of persons in the organization (e.g., "Adam", "Bob", "Carla") and the respective weight that should be assigned to segments that they said (e.g., indicated by points, or by a percentage value, or by other numerical value or quantitative indicator).

In some embodiments, optionally, a multiplier or a coefficient or other parameter may be utilized, in order to increase the weight of a particular participant or a particular segment, if one or more conditions hold true. For example, system 100 may be configured with a pre-defined condition or rule, that if a particular Participant has spoken more than 50 percent of the entire meeting, then, the Weight that should be assigned to the items said by that participant would be 1.75 times the "original" or "regular" weight that is typically assigned to that person or to that role; and therefore, if User Carla who is the CTO has spoken for 53 percent of the entire meeting time, then instead of allocating 28 points to items associated with her, such items would be allocated 49 points (which is 1.75 times 28 points). In other embodiments, such rule or condition may be configured to apply, selectively, only to persons that are above a pre-defined ranking level in the organization, or only to a closed list of users or participants, and not necessarily to all the participants; in order to filter-out low-level or low-ranking participant who happened to talk for a long time during the meeting.

In some embodiments, optionally, the relative weight that is assigned to a particular participant, may be multiplied (or divided) by a coefficient that relates to the relative participation time of that participant in that meeting; in order to selectively increase the weight of participants that actively participated in the meeting, and/or to selectively decrease the weight of participants who were generally passive in the meeting. For example, in a demonstrative example, a participant's original weight (e.g., in points) may be increased, by an additional number of points that match the number of percentage points of his participation; such that, for example, a participants that talked for 25 percent of the meeting, would be allocated 25 additional points of weight, and/or would be allocated 1.25 times his original weight; these are only demonstrative formulas, and other suitable formulas may be used in order to modify the relative weight of participants by taking into account how active or how passive they were during the meeting.

In some embodiments, optionally, the weight allocated to a participant may be a function of, for example, not only his title or role in the organization, and/or not only his level of activity in the meeting, but also his specific role in the specific meeting. For example, system 100 may be configured such that the relative weight of a participant who is the Meeting Organizer, would be 1.5 times the "original" or "regular" weight of such participant; and therefore, a CFO that attends Meeting 1 as a regular participant would be assigned a weight of 20 points, whereas the same CFO who attends Meeting 2 as the Meeting Organizer would be assigned a weight of 30 points. This may enable the system to allocate an increased weight to the Meeting Organizer, in this example. In other example, the system may be configured to allocate an increased weight to the participant who was identified as the Meeting Leader (may not necessarily be the Organizer; and may not necessarily be the highest-ranking person in the meeting), or to other participants based on other pre-defined rules or criteria.

Accordingly, the Conclusions and Action Items Detector 112 may operate by taking into account (i) the role or title of each participant as determined by the Roles Detector Unit 155, and (ii) the differential weight that was determine for each participant by the Differential Weight Allocator Unit 156, and (iii) one or more pre-defined rules or conditions that may operate on transcript segments or transcript portions in order to detect and determine action items, conclusion, suggestions that were approved in the meeting, suggestions that were rejected in the meeting, and/or other statements or items, optionally using textual analysis and/or NLP analysis of the transcript of the meeting.

For example, the transcript of the meeting may indicate that User Bob said "I think that we should sell Green Acre". The Roles Detector Unit 155 operates to determine that this was said by the Junior Assistant, and therefore this phrase is assigned a weight of one point. However, the transcript also indicates that immediately after that utterance, User Adam said "this is an excellent idea, let's do so immediately"; and the Roles Detector Unit 155 determines that this was said by the CEO, thus providing 50 points of weight to that phrase. A textual analysis of NLP analysis also indicates that the text said by the CEO, is Supportive relative to the text said by the previous speaker; and therefore, their points are added together to reach 51 points for that phrase. The Conclusions and Action Items Detector 112 may apply a rule that determines, that a phrase that gained at least 45 points in the aggregate, should be regarded and handled as an Action Item or as a Conclusion or as an Approved Decision; and the system outputs that item as an Action Item that was approved.

In another example, the system may identify that the transcript indicates that User Carla said "I think that we should buy Blue Acre"; and that her role in the organization is CTO; and thus, the weight that is assigned to this phrase is 28 points. However, the system detects that the transcript also indicates, that this phrase by User Carla was followed by a phrase by User Adam who said "This is a bad idea, we should not do that"; the system identifies that User Adam has the role of CEO, and assigns a weight of 50 points to his utterance. A textual analysis or NLP analysis indicates that the phrase of the CEO was Opposing to the phrase of the CTO, and therefore the system takes the 28 points (weight allocated to the CTO) and subtracts from it the 50 points (weight allocated to the CEO), reaching a result of −22 points; indicating that this is a non-decision or not an action item; or determining that the suggestion of the CTO to sell Blue Acre has been Rejected in this meeting, since it did not reach the threshold of 45 points or above, or since it gained a negative total weight.

The system may thus accumulate the weights as various participants discuss the same topic; and may check textually or contextually or via NLP analysis whether they support an item or oppose it, in order to Add their weighted points or to Subtract their weighted points. These operations may be performed by an Aggregate Weight Determination Unit 157.

In some embodiments, optionally, one or more rules may be utilized to indicate a "prevailing vote" or a "veto" or a "golden vote" of a particular participant; for example, indicating that any utterance that is said by the CEO or by the President of the company, should outweigh and should prevail over all other utterances, even if they accumulate a sufficient number of points to be regarded as a decision or as an action item. For example, even if the CTO and the CFO and the COO said, each one in his turn, "I think that we should sell Red Acre", and the total points of that utterance has reached 120 points, the CEO of the company has said "I do not like this idea", and this outweighs and prevails over the cumulative score or weight; even if typically an utterance by the CEO is associated only with (for example) 50 points of weight.

In some embodiments, optionally, more complex rules may be defined and applied by system 100, to take into account the weight of participants and also the type of Topic that the item is related to. For example, system 100 may be configured to reflect, that the CFO of the organization has a weight of 25 points with regard to items that relate to "money" or "budget" or "finance" or "revenue" or "income" or "expenses"; but has a weight of only 14 points with regard to items that relate to "technology" or "computers" or "timeline" or "marketing". Similarly, the system may define that the Chief Marketing Officer would be assigned a weight of 42 points when the utterance is about "marketing" or "sales" or "advertising", but would be assigned only a weight of 17 points when the utterance is about "downsizing" or "real estate" or "computers". In some embodiments, optionally, the Differential Weight Allocator Unit 156 may utilize a lookup table or a database, that indicates: (i) which words or keywords, when said by a particular type of participant (e.g., CTO), trigger an increased weight; and (ii) which words or keywords, when said by that same type of participant (e.g., CTO), trigger a reduced weight; thereby enabling the system to allocated or to assign an increased weight to an utterance by the CTO when he talks about "computer servers", but to allocate or to assign a reduced weight to another utterance by that same CTO when he talks about "marketing". This may enable the system to dynamically allocate differential weight to utterances, by taking into account the context and/or topic of the utterance, in addition to the characteristics of the uttering participant.

In some embodiments, a method comprises: obtaining an audio recording of a meeting; obtaining a transcript of said meeting from said audio recording; allocating differential weight to utterances of different participants in said meeting. In some embodiments, the method further comprises: determining an aggregate weight for a particular item in said meeting, based on cumulative weights of utterances of a plurality of participants in said meeting regarding said item.

In some embodiments, the method comprises: if said aggregate weight is greater than a pre-defined threshold value, then: determining that said particular item is an approved decision or an approved action item. In some embodiments, the method comprises: if said aggregate weight is smaller than a pre-defined threshold value, then: determining that said particular item is a rejected proposal.

In some embodiments, the allocating comprises: determining that a particular participant in the meeting has a particular organizational title; allocating a pre-defined weight to utterances of said particular participant in said meeting. In some embodiments, the method comprises: determining that said particular participant has said particular organizational role, based on a pre-defined lookup table that matches between participant names and organization titles.

In some embodiments, the method comprises: determining that said particular participant has said particular organizational role, based on analysis of an organizational chart or a corporate directory. In some embodiments, the method comprises: determining that said particular participant has said particular organizational role, based on Natural Language Processing (NLP) analysis of a portion of said transcript which indicates that said particular participant has said particular organizational role.

In some embodiments, the method comprises: determining that said particular participant has said particular organizational role, based on analysis of scheduling information related to said meeting. In some embodiments, the allocating comprises: determining that a particular participant in the meeting has a particular organizational title; allocating a pre-defined weight to utterances of said particular participant in said meeting; dynamically modifying said pre-defined weight, only with regard to utterances that contain one or more pre-defined keywords.

In some embodiments, the allocating comprises: determining that a particular participant in the meeting has a particular organizational title; allocating a pre-defined weight to utterances of said particular participant in said meeting; dynamically modifying said pre-defined weight, only with regard to utterances that are determined to relate to a particular topic, based on NLP analysis of the transcript of said meeting.

In some embodiments, the allocating comprises: determining that a particular participant in the meeting has a particular organizational title; allocating a pre-defined weight to utterances of said particular participant in said meeting; dynamically modifying said pre-defined weight, by taking into account a level of activity or passiveness of said particular participant in said meeting.

In some embodiments, the allocating comprises: based on textual analysis of emails and messages, that invite participants to attend said meeting, determining organizational roles of each participant, and allocated to each participant a pre-defined weight; dynamically adjusting the pre-defined weight, that is assigned to a particular utterance of a particular participant, based on a level of relevance of the topic of said particular relevance to the organizational role of said participant.

In some embodiments, the method comprises: based on textual analysis of the transcript, determining that a particular participant opposes a particular suggested item; and reducing a cumulative weight, that as accumulated for said particular suggested item, by the weight that is allocated to said particular participant that opposes.

In some embodiments, the method comprises: allocating a prevailing weight to utterances of a particular participant, wherein said prevailing weight prevails over any cumulative weights of all other participants. In some embodiments, the method comprises: analyzing email addresses of participants in said meetings, and extracting at least one website related to said email addresses; analyzing content of said website, and constructing from said content at least a partial organizational chart; allocating weight to utterances of participants, based on said partial organizational chart that was constructed from content of said website.

In some embodiments, the method comprises: performing textual analysis and NLP analysis of the transcript of said meeting, and analysis of meta-data about participants of said meeting; constructing a proposed list of roles of participants; presenting said proposed list of roles of participants, to an organizer of said meeting for confirmation or modification; and applying to said proposed list of roles one or more confirmations or modifications that said organizer provides.

In some embodiments, the method comprises: performing textual analysis and NLP analysis of the transcript of said meeting, and analysis of meta-data about participants of said meeting; constructing a list of estimated roles of participants; presenting to each participant in said meeting, a request to confirm or to modify his estimated role.

In some embodiments, the method comprises: based on cumulative weights that are assigned to a first utterance in said meeting, determining that said first utterance is an approved decision; based on cumulative weights that are assigned to a second utterance in said meeting, determining that said first utterance is a rejected proposal; automatically generating a meeting summary report, indicating at least one of: (i) a list of approved decisions, (ii) a list of rejected proposals.

The Applicants have realized that the efficiency and/or productivity of some meetings may be improved or increased, by utilizing and/or by incorporating into the meeting an automatic meeting moderation "bot", or an automatic meeting moderation unit or meeting moderation device. Such unit or device may be referred to as a "Meeting Moderator Bot" or "MMB", and may be implemented by using a suitable combination of hardware components and/or software components. For example, as demonstrated in FIG. 1, a computerized or automated MMB 160 may be part of system 100, and may monitor the audio uttered or spoken by the various participants in the meeting, and may record such audio and analyze the text extracted from it; may perform textual, contextual and/or other analysis of the conversation, in real time or in near-real-time; may utilize a presentation that was presented or that is being presented, including already-shown slides (or content) and including not-yet-shown slides (or content); may utilize such content in order to advise, in real time, via a textual notification and/or via audio notifications, which may be conveyed to all the participants in the meeting or selectively only to one participant or to several particular participants, such notifications conveying real-time advice or guidelines, as well as real-time steering or guidance of the meeting and/or of particular participants to a particular direction or topic, or away from a particular direction or topic.

The MMB 160 may optionally comprise, or may be associated with, an Audio Monitoring Unit 161, able to record and analyze the audio spoken or uttered by each participant in the meeting. For example, the Audio Monitoring Unit 161 may monitor how many seconds each participant speaks, and may also determine its participation percentage relative to other participants; may detect that Participant Adam has spoken for a cumulative time of 4 seconds in the past 10 minutes, whereas Participant Bob has spoken for a cumulative time of 400 seconds in the past 10 minutes. The Audio Monitoring Unit 161 may utilize or enforce a pre-defined rule, that indicates that each participant out of the N participants in the meeting, is expected or is allowed or is encouraged to talk approximately 1/N or approximately 2/N of scheduled time-length allocated to this meeting; or that each participant out of the N participants is expected or allowed to talk, cumulatively, not more than 2/N of said time-length and/or is required to talk and to contribute verbally to the meeting at least 0.5/N of said time-length; or may utilize or enforce other rules, which may be monitored and/or enforced continuously, or at pre-defined time-intervals (e.g., every 30 seconds). For example, the Audio Monitoring Unit 161 may trigger a Selective Per-Participant Notification Unit 162 to selectively generate a particular notification message (e.g., verbal and/or textual), that is then conveyed selectively and only to Participant Adam, indicating to that participant that "You have talked only 4 seconds in the past 10 minutes, please consider to contribute more to this meeting"; or, to selectively notify to Participant Bob that "You have spoken 40% of the meeting time so far, please consider to allow others to participate too". In some implementation, the rules may be enforced at pre-defined time intervals (e.g., every 30 or 60 seconds), based on the participation-so-far of each participant; for example, checking the relative percentage of the verbal participation of each participant, as part of the time-length that have already elapsed since the start of this meeting. In some embodiments, optionally, such enforcement may be automatically started by the MMB 160 only after T seconds have passed since the start of the meeting (e.g., only after 300 seconds or 5 minutes have passed), in order to allow the system to monitor and analyze the verbal participation so far without yet intervening with its guidelines or advice, and/or in order to provide ample opportunity to the human participants to communicate verbally for several minutes before MMB 160 intervention and guidance; and optionally, in such initial period of time, if indeed used, the MMB 160 may only listen in and monitor the audio conversations, without yet injecting or adding its own real-time notifications.

In some embodiments, optionally, the pre-defined rules may also take into account the Role that was defined and/or identified for each participant in the meeting, in order to allow and enforce a differential weight or a differential time-allocation to the participation of different users; for example, enforcing a rule that allows the participant who has "CEO" or "CFO" role to participate verbally up to 75% of the time-length of the meeting that elapsed so far, or enforcing a rule that allows the participant who has the role of "Junior Assistant" to participate verbally up to 3% of the time-length of the meeting, or the like.

In some embodiments, the Audio Monitoring Unit 161 and/or the MMB 160 may monitor whether or not a first participant speaks on top of (or, in parallel with, or concurrently with) another participant, and for how many seconds such overlap speech occurs; and may also detect or determine which one of two (or more) concurrently speaking participant is the one that "intervened" and spoke on top of another participant who had already been talking beforehand. For example, the Audio Monitoring Unit 161 and/or the MMB 160 may monitor the audio stream(s) and may determine that Participant Adam was talking for 30 seconds; and that within those 30 seconds, Participant Bob started talking at 23 seconds and stopped talking at 28 seconds, such that Participant Bob spoke over and concurrently with the already-speaking Participant Adam for an overlapping time-period of 5 seconds. Accordingly, the MMB 160 determines that Participant Bob should be considered or tagged as the "interfering" or "intervening" participant; and the MMB 160 may selectively generate and convey a notification (e.g., verbal, textual) that would be conveyed or shown only by Participant Bob, indicating to him that "Attention, you have spoken concurrently with other participants for K times already and/or for T seconds already, please refrain from doing so again".

In some embodiments, the MMB 160 may utilize or enforce a pre-defined rule, indicating that such warning notification should be generated and conveyed if one or more pre-defined conditions or threshold values are met; for example, if the MMB 160 detected that Participant Bob has already performed at least K times such interfering speech, or if the MMB 160 detected that Participant Bob has so far spoken cumulatively at least 12 seconds of such interfering speech. In some embodiments, such rules may comprise, or may take into account, optionally, the particular Role of each participant in the meeting; for example, enforcing a rule that allows a participant whose role is "CEO" or "CTO" to interfere with other speakers up to 60% of the meeting length, or enforcing a rule that does not allow a participant whose role is "Junior Programmer" to interfere with other speakers more than 2% of the meeting time or not more than 3 times in total; or the like.

The Audio Monitoring Unit 161 may also monitor and detect whether a particular participant speaks at an excessively low volume (e.g., below a pre-defined minimum threshold value), or speaks at an excessively high volume (e.g., below a pre-defined maximum threshold value); and based on such detection, the MMB 160 may generate and convey, selectively, notifications to the relevant participants; such as, a notification sent or conveyed only to Participant Adam to indicate "You have been talking at a quiet voice that may be difficult for others to hear, please consider to raise your voice or to speak closer to your device's microphone"; or conversely, may generate and convey a notification to Participant Bob to indicate "You have been talking at a loud voice that may be uncomfortable for other participants, please consider to lower your voice or to speak further away from your device's microphone".

The Audio Monitoring Unit 161 may also monitor and detect whether a particular participant provides an audio input that is cluttered with noise or background noise or ambient noise; for example, detecting that the audio incoming from Participant Adam has a background noise or environmental noise; and triggering the MMB 160 to selectively generate and convey a notification to that particular user, advising him that "Your audio channel appears to be noisy, please check if you can move to another physical location or close the door or close the window in order to reduce background noises". This may be based on analysis of the quality of the audio and/or the quality of the speech, that is incoming from a particular participant; and/or based on a detection that a particular audio channel is cluttered with background noise; by utilizing one or more suitable algorithms for estimating the clarity of speech or the clarity of the audio that is incoming from this channel, and/or by detecting a recurring background noise pattern, and/or by utilizing other estimates of Signal to Noise Ratio (SNR) or other quality indicators and then comparing them to pre-defined threshold values and/or by comparing them to the quality indicators that characterize the audio channels of other participants in the same meeting.

In some embodiments, the system may be configured such that the above-mentioned notifications would be conveyed as audible notifications only to one or more particular participant(s), in a manner that allows only that particular participant or those particular participants to hear the audio notification, without other users being able to hear it. For example, users Adam, Bob, Carla, David and Eve participate in a phone-based conference call. User Adam is detected to have the role of CEO; user Bob is the organizer of the meeting. The MMB 160 detects that User Carla has spoken too little so far in this meeting; and sends to User Carla a textual notification that is displayed only to her, on the screen of her electronic device (e.g., smartphone, tablet, laptop computer, desktop computer), urging her to participate more in this meeting. Optionally, an audible message that conveys said advice, is injected or added only to the audio channel that is received by Carla's device, such that only Carla can hear the audible message that is directed to her, whereas the other four participants cannot hear this audible notification. In another example, the MMB 160 detects that user Dave repeatedly interferes with the speech of other users, and has done so for at least 3 times in the past five minutes; and therefore, the MMB may send or convey a notification warning about this to user Dave himself; and optionally, may send a notification about this to user Adam because his role is CEO, and/or to user Bob because he is the organizer of the meeting; but not to users Carla or Eve. In another example, the system may be configured such that notifications are conveyed, verbally and/or textually, only to the relevant participants that are required or requested to change their behavior by the content of the notification, or, also to one or more other participants based on their role(s) in the organization and/or in the meeting.

In some embodiments, optionally, such operations may be implemented by a dedicated unit or module, such as a Double-Talk/Multi-Talk Detector Unit 165, which may monitor the audio of participants and may detect concurrent double-talk (by two participants) or concurrent triple-talk (by three participants) or concurrent multi-talk (e.g., two or more participants talk concurrently); and may trigger the MMB 160 to generate and convey notifications or warnings, selectively to the particular participants that are engaged in such multi-talk, or selectively only to the participants that the system estimated to be the "interfering" or "intervening" talker, and/or to one or more pre-defined participants or users (e.g., to the meeting organizer; to the participant having the highest organizational role); or the like. The detection of such double-talk or multi-talk, and the warning notifications that are generated and conveyed due to such detection, may operate to achieve multiple purposes; for example, not only in order to increase the courtesy of the meeting, but also in order to increase the efficiency of the meeting such that participants would be able to clearly hear each other without interfering talkers, and/or to improve the ability of the system itself to acquire the uttered speech in non-interfered manner and to improve the quality and accuracy of speech-to-text conversion and analysis.

In some embodiments, optionally, the system may even be configured to allow the MMB 160 to automatically and selectively mute a participant if one or more pre-defined conditions hold true; for example, to automatically mute the audio of a participant, for a period of T seconds (e.g., for 15 seconds), if that participant has interfered with speech uttered by other participants for at least P times (e.g., at least 5 times) in the past T minutes (e.g., in the past 10 minutes) and has received at least W warnings (e.g., at least three automatic warnings) not to interfere when others are talking; and such participant may receive a dedicated message or indication, to convey to him that he is currently being muted due to his multiple interference incidents in the past T minutes of this meeting.

Optionally, a Transcript Analysis Unit 163 may operate to generate a transcript of the meeting on a continuous and ongoing basis, in real time manner or in near-real-time manner, such as by utilizing a speech-to-text converter that is applied separately on each incoming audio channel and/or that is applied to the cumulative (mixed) audio stream; and such unit may continuously analyze the transcript of the meeting so far, in order to trigger the MMB 160 to generate and convey user-specific notifications or advice, or meeting-specific guidance or advice or steering that would be applied by the MMB 160. Such analysis may be performed on a continuous basis, or at pre-defined time intervals (e.g., every 30 or 60 seconds). For example, the Transcript Analysis Unit 163 may analyze the transcript of the first 25 minutes of the meeting that have elapsed so far; may detect that this meeting was allocated a total length of 45 minutes; may detect that the Agenda for this meeting, includes: "Topic 1=Budget, Topic 2=Timeline, Topic 3=Legal"; may perform textual and/or contextual analysis of the transcript of the first 25 minutes, and may detect that Budget was heavily discussed by Timeline was not discussed at all (e.g., lack of any time-related terms in the transcript so far, such as, no "day" or "month" or "week" or "year" or "2019" or "September", or the like; with excessive and recurring discussion that repeatedly mentions "dollars" and "budget" and "money" and "funding"); and may thus deduce or estimate that in the 25 minutes that elapsed so far, the topic of Budget was (or is) indeed discussed, whereas the topic of Timeline was not discussed. Such determination may trigger the MMB 160 to generate and convey a notification; for example, selectively shown to (or heard by) only the meeting organizer, or only the CEO role, or by all the participants in the meeting, to indicate to them that "Attention, the Agenda for this meeting includes Three topics, and my automated analysis of the speech so far indicates that only Budget was discussed, please consider to discuss now the next topic of Timeline and also the final topic of Legal".

For example, an Agenda Extraction and Monitoring Unit 164 may operate to extract or obtain the agenda of topics for this particular meeting; for example, by extracting topics from an Invitation to the meeting as sent to participants; by extracting data from a slide or a presentation that is shown during the meeting and that includes an "Agenda" title followed by a list of topics; by extracting such Agenda from a file (e.g., a PowerPoint file) that was attached to the meeting invitation and/or that was shared or opened during the meeting or as part of the meeting, or that was shown on the screen of the online meeting to users who participate via an electronic device capable of showing such content; or by extracting or estimating the Agenda for the meeting by contextual analysis of the audio or the transcript of the meeting so far (e.g., detecting that the CEO participant has said "The agenda for this meeting includes Budget, Timeline, and Legal Implications"), or by analysis of text already spoken or shown or shared in the meeting so far; or by analyzing not-yet-shown slides or content that are associated with the meeting and were not yet shown to the meeting participants (e.g., automatically detecting that for the first 15 minutes of the current meeting, the meeting remains showing Slide 1 of the presentation which is titled "The main purpose of this meeting", but did not yet advance to Slide 3 of the presentation which is titled "Topics/Agenda").

The Agenda Extraction and Monitoring Unit 164 may then monitor the progress of the meeting, by monitoring and analyzing the audio of meeting participants and/or by performing textual and contextual analysis of the transcript of the meeting so far; and may detect or determine whether, for example, (i) the meeting is progressing in accordance with a pace that is compatible with the extracted agenda, or (ii) the meeting is lagging behind or dragging behind the extracted agenda, or (iii) the meeting is rushing ahead through topics too fast, or (iv) the meeting has skipped a topic or a set of topics, or (v) the meeting has discussed so far some of the planned topics but in an unplanned order, or other insights with regard to matching or mis-match between the planned agenda/topics and the actual ongoing meeting so far. For example, the Agenda Extraction and Monitoring Unit 164 may extract or obtain a meeting agenda, indicating that P topics (e.g., three topics) are planned for discussion (e.g., Budget, Timeline, Legal); may extract data, such as from the meeting invitation, indicating that T minutes (e.g., 60 minutes) in total are allocated to this meeting; may automatically allocate to each topic an even time-slot of T/P minutes; and may monitor whether the content of the already-used time-slot(s) matches their respective planned topic(s). In some embodiments, for example, the Agenda Extraction and Monitoring Unit 164 may detect that the meeting is currently at its 22nd minute since its start; and that the conversations in the meeting in the past 90 seconds have included several times the terms "budget" and "money" and "dollars", and did not include any time-related terms or words or phrases; and therefore, may trigger the MMB 160 to generate and convey, to all the participants or selectively only to one or more participants, a notification indicating that "Please note that one third of the meeting time has elapsed, and it is time to discuss the second topic out of the three topics, which is Timeline". In some embodiments, the Agenda Extraction and Monitoring Unit 164 may generate and convey such notification before the relevant time-slot ends or begins; for example, during the 18th minute of the meeting, the Agenda Extraction and Monitoring Unit 164 may trigger the MMB 160 to generate and convey a message to indicate that "Please note that Two Minutes remain for discussion the first topic of Budget, and in two minutes you are requested to proceed to discuss the second topic of Timeline". Moreover, in some implementations, the Agenda Extraction and Monitoring Unit 164 may continue to monitor the ongoing audio discussion and its transcript, and may detect during the 21st minute of the meeting that the discussion still does not relate to Timeline, and may thus trigger the MMB 160 to generate and convey the notification during said 21st minute of the meeting in order to steer the meeting towards the planned topic or direction.

In some implementations, the Agenda Extraction and Monitoring Unit 164 may automatically detect that the meeting is rushing ahead or is dragging behind, relative to the extracted planned agenda of topics; and may trigger the MMB 160 to generate an appropriate notification, in order to speed-up or to slow-down the pace of the meeting and/or the conversation, and/or in order to steer the meeting towards a consistent pace or a planned pace. For example, in the above example, the Agenda Extraction and Monitoring Unit 164 may analyze the audio spoken and the transcript of the first 12 minutes of the meeting, and may detect that the first topic of Budget was discussed for only 5 minutes, and the second topic of Timeline was discussed for additional 4 minutes, and that the conversation in minutes 10 through 12 is revolving around Legal Implications; and may trigger the MMB 160 to generate and convey a notification, to at least one participant, or to all the participants or to some of them, in order to indicate that "Please note that the Agenda has planned to allocate 20 minutes to each topic, but the meeting so far has already discussed two of the three topics in its first nine minutes; please consider whether additional discussion is required regarding the topics of Budget and Timeline that appear to have been Rushed". Similarly, the Agenda Extraction and Monitoring Unit 164 may detect an out-of-order topic, or that the meeting is progressing in a mixed order of topics that does not match the planned order in the extracted Agenda; and may thus trigger the MMB 160 to generate and convey a notification that "Please note that Topics 1, 4 and 5 were discussed in the 20 minutes that elapsed in this meeting, but Topics 2 and 3 appear to have been skipped, please consider to discuss now Topics 2 and 3". Optionally, the MMB 160 may generate a notification, in near-real-time, upon detecting that the meeting is currently discussing an out-of-order topic that is not yet scheduled for discussion; for example, detecting during the 12th minute of the meeting that the term "legal implications" is uttered several times by participants, and generating a notification that "Please note that the Topic of Legal Implications is scheduled to be discussed only during the last third of this meeting, and please note that the Legal Advisor was invited to participate only in that last third of the meeting" (e.g., extracting such additional information from the meeting's invitation or meta-data, and utilizing it in conjunction with the Agenda Extraction and Monitoring Unit 164 in order to steer the meeting towards a direction that is compatible with the planned arrival or planned departure of participants). Similarly, the MMB 160 may generate a notification, during the 35th minute of the meeting, that "Please note that the topic of Budget was not yet discussed, and the CFO is scheduled to leave this meeting and attend a different meeting within 7 minutes from now, therefore please consider to discuss the topic of Budget right now and within the next 7 minutes"; thereby steering the meeting towards a topic that requires the participation of a particular participant, and by taking into account this user's availability, departure or arrival.

In some embodiments, the Agenda Extraction and Monitoring Unit 164 and/or the MMB 160 may also take into account, not only the topics as planned and as progressed so far, but also the relative participation of one or more participants with regard to each topic, in order to guide or steer the meeting towards (or away from) a particular topic, or in order to elicit or induce input from a particular participant. For example, the Agenda Extraction and Monitoring Unit 164 may detect that Topic 3 on the Agenda of this meeting is Legal Implications; and that one of the participants is identified as "John Smith, Legal Counsel"; and may further identify that in the first 50 minutes of the conversation, out of the entire 60 minutes that are allocated to this meeting, said participant (John) has spoken for only 14 seconds; and may deduce that this input from the Legal Counsel may be in sufficient for a Topic that was planned to span 20 minutes of the meeting; and therefore, the MMB 160 may automatically generate and convey a message, only to that participant (John), or to some of the participants or to all of them, to indicate that "Topic 3 of this meeting is Legal Implications, and User John who is the Legal Counselor is encouraged to talk now about this topic".

In some embodiments, the MMB 160 may comprise, or may be associated with, a Meeting Guidance and Steering Unit 166, which may perform one or more of the above-mentioned steering operations, and/or may perform other pre-defined meeting management operations which may be pre-defined particularly per meeting, or per type of meeting, or for all meetings of an organization. For example, some implementations may configure the system such that the Meeting Guidance and Steering Unit 166 will generate and convey, to all participants or to some participants, after T minutes into the meeting (e.g., during the 3rd minute of the meeting), that "Please say the Agenda or the Topics for this meeting". Such notification may serve one or more purposes; such as, it may increase the productivity or the efficiency of the meeting, and/or it may further enable the system itself to extract or obtain the Agenda/Topics for the meeting (e.g., from the audio that participant(s) will generate after such notification), thereby enabling the MMB 160 to better moderate the meeting and steer it and guide the participants and advise to participants. Similarly, the Meeting Guidance and Steering Unit 166 may indicate to participant(s) whether the meeting is dragging-behind or is rushing-ahead (e.g., relative to the planned agenda or list of topics); whether a particular person is expected to leave at a certain time-point and therefore should be heard before he departs; whether a particular person is expected to join at a particular time-point and therefore a topic that is relevant to him should be postponed or delayed until his actual joining into the meeting; or the like. In another demonstrative example, the Meeting Guidance and Steering Unit 166 may be pre-configured to automatically generate and convey, approximately T minutes (e.g., 4 minutes) prior to the scheduled ending time of the meeting, a notification indicating to participant(s) that "There are T minutes remaining for this meeting, please provide now a summary of action items"; and such indication may further improve the ability of system 100 itself to later extract action items or tasks and/or to generate a meeting summary that contains such tasks and action items.

In some embodiments, the MMB 160 may be invited or added to a meeting in advance, such as during or upon the creation of the definition of a computerized record about a future meeting. For example, user Adam may utilize a scheduling application or an email application in order to invite three other human users to the meeting (users Bob, Carl, David); and may also invite or reserve or add to this meeting one or more resources, such resources including, for example, a location resource (e.g., "North Conference Room" that should be reserved to this meeting from 10 AM until 11 AM), an equipment resource (e.g., "Prototype A" or "Projector B" which should be brought into the meeting), a service resource (e.g., "Beverages Serving", to indicate to office support team-members to serve beverages to participants that would participate physically at the conference room), and resources that are provided by system 100 as described above. Specifically, user Adam may invite to the meeting an "MMB" invitee or service, as a Meeting Moderator Bot which may be pre-defined on the system; and which may immediately confirm or approve its participation; and once the meeting starts (e.g., a week later), the system automatically spins-up or launches the MMB module or unit as an additional participant in that meeting, which monitor the audio conversation and the transcript, and which steers or guides or moderates the meeting in real time as the meeting progresses. In some embodiments, some or all of the participants may be notified, upon the start of the meeting, or upon the joining of each participant into the meeting, or via a continuous on-screen notification, that an automated MMB is virtually attending and chaperoning this ongoing meeting, and that said automated MMB records the conversations and analyzes them in order to enhance the quality or efficiency or productivity of the meeting. In some embodiments, for example, if T minutes into the meeting, a new user joins the meeting, then the system may generate an audio message (e.g., that the meeting is recorded and/or analyzed by an automated MMB) that would be played-back and heard only by that particular freshly-joining participant, and not by previously-joined participants; for example, by playing such audible notification only via the audio channel of that particular user, and not on the "bridge" or the mixed audio channel that the entirety of the meeting participants hear. Similarly, a textual notification may be displayed, for T seconds (e.g., for ten seconds), only on the screen of such freshly-joining participant, to alert him to the participation of an automated MMB in the meeting.

Similarly, meeting insights or meeting guidance that is generated by the MMB 160 while the meeting is in progress (e.g., guiding a participant to address a particular topic; or warning a participant to avoid double-talk; or requesting a participant to raise his voice; or alerting participants that it is time to move from Topic 3 to Topic 4), may be generated and conveyed by the MMB 160 towards all the participants, or selectively only towards a particular participant or a particular subset of the participants; or may be conveyed discretely only to a particular participant via his exclusive audio channel or via the screen of his own electronic device, without necessarily providing such message or notification (via audio or via text) to other participants. This may allow the system, for example, to generate and to selectively convey productivity-enhancing messages and notifications, to the participant(s) that are relevant to such notifications, without necessarily burdening the other participants with excess messages or notifications which may not be relevant to them.

In some embodiments, optionally, the MMB 160 may further track, monitor, analyze and also convey, the rate of compliance of participant(s) with the notifications generated by the MMB 160; and may generate statistics that indicate whether, or to what extent, such notifications or recommendations by the MMB 160 were indeed followed. For example, the MMB 160 may generate statistics that indicate: (i) that a total of 4 double-talk warning notifications were generated during the meeting, and that 3 of them have led to compliance (e.g., three talkers that were warned, did not resume any double-talk); and/or (ii) that 5 times the MMB 160 has suggested to particular participants to talk louder or quieter, and that 80 percent of the notifications were indeed followed by user compliance with the requests; and/or (iii) that the MMB 160 has requested that the Agenda would be stated, but this request was not complied with; and/or (iv) that the MMB 160 has requested that a Summary of Action Items would be stated towards the end of the meeting, and this request was complied with; and/or (v) that in 4 occasions, the MMB 160 has requested to steer the meeting towards (or away from) a particular topic, and that 75% of the requests were indeed followed with user compliance; and/or other suitable statistics that indicate the quantity and type of MMB-generated messages and their compliance rate or non-compliance rate. Such information may be utilized by the organization in order to quantify or estimate the contribution of the MMB 160 to the productivity or efficiency of a particular meeting, or of a type of meeting (e.g., marketing meetings) or to all meetings of an organization.

In accordance with some embodiments, the system may further operate such that the Moderator Bot unit would monitor, detect and/or recognize one or more particular pre-defined phrases or terms or word-combinations, that speakers say or utter during the meeting; and would automatically and/or autonomously perform one or more pre-defined operations or actions that are triggered by such recognition or detection.

For example, meeting participant Adam says during the meeting: "Action Item, send out budget proposal to the customer, End of Action Item". The Moderator Bot unit is pre-configured to monitor the triggering phrase "Action Item" and the triggering phrase "End of Action Item"; and to extract the text (converted from speech) that was uttered by that speaker between those two triggers; and to add that particular extracted speech to an automatically-generated and dynamically-updated list of Action Items; and/or such list may be presented and/or sent to one or more pre-defined participants (e.g., the meeting organizer, the meeting owner, one or more particular participants, or all the participants; and optionally to pre-defined third-party users), after the meeting is over, or (in some implementations) dynamically and in real time even during the meeting, and/or the dynamically-updated list of Action Items may be presented on the screen of meeting participants in real-time and/or upon ending of the meeting. In some embodiments, optionally, the ending trigger of "End of Action Item" need not necessarily be used; and rather, the Moderator Bot may extract the text of the action item that begins with the "Action Item" commencing trigger, and that ends by, for example: (i)

detection of a pause of at least N seconds (e.g., three seconds) in the speech of the current participant who says the action item; and/or (ii) detection of a speech or an utterance by another, different, participant.

In another example, meeting participant Barbara says during the meeting: "Hey Mia, Decision, we will abandon the upgrade project, End of Decision". The Moderator Bot unit is pre-configured to monitor the triggering phrase "Hey Mia" as an initial trigger to the Moderator Bot unit that a command would follow immediately; and then to recognize the triggering phrase "Decision"; and to extract the text (converted from speech) that was uttered by that speaker between those trigger of "Decision" and the trigger of "End of Decision"; and to add that particular extracted speech to an automatically-generated and dynamically-updated list of Decisions for that meeting; and such list may be presented and/or sent to one or more pre-defined participants, or (in some implementations) dynamically and in real time even during the meeting; and/or the dynamically-updated list of Decisions may be presented on the screen of meeting participants in real-time and/or upon ending of the meeting. In some embodiments, optionally, the ending trigger of "End of Decision" need not necessarily be used; and rather, the Moderator Bot may extract the text of the action item that begins with the "Hey Mia, Decision" commencing trigger, and that ends by, for example: (i) detection of a pause of at least N seconds (e.g., three seconds) in the speech of the current participant who says the action item; and/or (ii) detection of a speech or an utterance by another, different, participant.

Similarly, the system may utilize detection of a commencement uttered trigger of "Agenda", and optionally an ending trigger of "End of Agenda", to detect speech portions between those two triggers that are then used by the system to automatically construct a textual Agenda that is then sent and/or presented to participants and/or to particular third-parties. Optionally, the extracted text of the Agenda, between the two verbal triggers, may be further analyzed to detect, for example, numerals such as "1" and "2" and "3" or other separators of topics that the speaker may utter as he says the agenda items; and the Moderator Bot unit may utilize such enumeration in order to construct an Agenda list that is similarly divided into enumerated items.

The system may similarly utilize pre-defined phrases to detect commencement and/or ending of speech that relates to, for example, "Conclusions" (and optionally "End of Conclusions"), or to "Summary" (and optionally "End of Summary"), or to "Introduction" (and optionally "End of Introduction"), or "Topic", or "Note", or "Reminder", or "Action Item", or "To Do Item", or "Task Delegation", or the like.

The phrases to be recognized and detected may be defined in a lookup table or a database, which lists or represents, for example: (i) optionally, an initial trigger (such as "Hey Mia" or "Hey Robot"), to alert the Moderator Bot that an action trigger will follow; (ii) an Action Commencement trigger (e.g., "Action Item"); (iii) optionally, an ending trigger (such as "End of Action Item") to assist the Moderator Bot unit to detect that the action descriptor is ending.

In some embodiments, the triggering key-phrases or vocal command or vocal cues, may be defined in the system as Speaker Dependent, and/or may be associated with priority orders that are based on pre-defined roles in the organization (e.g., C-Level executives having higher priority than other participants) and/or based on meeting roles (e.g., meeting Leader/Organizer has higher priority than other participants). For example, User Adam may define his own triggering vocal cues, such as, "Hey Now Decision" for triggering detection of a Decision item; whereas User Bob may define his different triggering vocal cues, such as "Let's Tane Note of a Decision" for triggering detection of a Decision item; whereas User Carl may define his triggering vocal cue of "To Recap This" as a trigger for such Decision item. The Moderator Bot detects the phrase, and also checks if the phrase was said or uttered by a person associated with that triggering phrase, in order to apply the suitable policy for gathering information, taking notes, summarizing, or the like.

In some embodiments, optionally, the lookup table or database may further indicate that only speech from particular participant(s), such as the meeting organizer or the meeting owner or the CEO of the organization, would be recognized and acted upon with regard to the above-mentioned actions. For example, if the CEO says "Decision", then the Moderator Bot unit proceed to extract his next phrase and to isolate it as a Decision; whereas, if a Junior Assistant who attends the meeting says "Decision", the Moderator Bot unit recognizes that the speaker is not one of the pre-approved participants for conveying such information and therefore the Moderator Bot unit does not add the next utterance of the Junior Assistance to the list of Decisions.

In some embodiments, the owner of the meeting is recognized (e.g., during the meeting) by a speaker identification unit or module; and the keyword detection process of the Moderator Bot unit may thus recognize or identify "keywords" or "key phrases" that are pre-defined and known to the system (e.g., Agenda, Topic, Decision, Summary, or the like). Optionally the system may perform a cross-check between the recognized speech portion and the recognized speaker, since some implementations may configure the system to only act upon commands of certain particular participants (e.g., CEO) and not other meeting participants (e.g., Junior Assistant). In some embodiments, the recognized phrases are then added to the meta-data of the meeting and/or or to the presentation that is generated automatically for the meeting, in a manner that is searchable by users; thereby enabling a user to command the system to find any meeting-portions or meeting-segments of "Action Item", and in response, the system shows to the user the text-portions of the meeting transcript which correspond to such "Action Items", and/or enables the user to hear a partial audio segment that corresponds exactly to that phrase in the meeting. For example, when participant Adam says during the meeting, "Hey Mia, Action Item: send price proposal to Big Company, End of Action Item", the Moderator Bot not only extracts the text of that action item and adds it to the list of textual action items, but also stores an indication that this Action Item was uttered by participant Adam at 3:54 minutes into the meeting and lasted five seconds. The list of Action Items (or summary, or topics, or agenda, or other automatically-constructed lists) may thus include also a link or button or option of "play audio segment", and its actuation causes the system to retrieve and play-back this exact segment or portion of the recorded audio, which corresponds to the selected Action Item. This may further enable rapid and efficient navigation within the meeting's recorded audio.

Optionally, in some embodiments, the textual meta-data generated by the Moderator Bot unit, may further be analyzed or processed by an AI engine, to extract from them a higher-level of insights; for example, an insight indicating a current stage of a project, an insight indicating that a budget was increased or decreased, an insight indicating that a particular business proposal is accepted or is abandoned, or the like. Optionally, notifications or messages with such higher-level insights may be sent to one or more meeting participants and/or to other pre-defined entities (e.g., the CFO or CEO of the organization, even if they did not attend that meeting).

In some embodiments, the system may further operate to enable meeting participants to inject "bookmarks" or "tags" into an ongoing audio meeting and/or video meeting; and such bookmarks or tags may then be utilized by the Moderator Bot unit to perform one or more pre-defined actions, and may be part of a summary or presentation that is generated automatically for a meeting, and/or may be used to enable rapid or efficient navigation between such bookmarks or tags. For example, participant Carl may say during the meeting, "Hey Mia, let's talk about Budget". The phrase of "Hey Mia, let's talk about" may be pre-defined in the system as a trigger for identifying a bookmark or a phrase; such that the Moderator Bot unit utilizes the next utterance, which is "budget", as a Bookmark or as a Tag: the Moderator Bot unit marks this word ("budget") or phrase in bold or with yellow marker or with other visual emphasis in the textual transcript that is generated for the meeting; and also, adds an indicator that allows a reader to "jump" or browse directly to this transcript-portion, or to the corresponding audio-portion in which this was said (since the Moderator Bot unit also saves an indication that this Bookmark corresponds to a particular time-point since the start of the recorded meeting). Later, participant David says "Hey Mia, let's talk about Revenue", the Moderator Bot unit extracts a new tag or bookmark of "Revenue", and links it to that audio-portion of the recorded audio and also to that transcript-portion of the generated transcript. The generated meeting transcript and/or summary may thus enable the user to search for such bookmarks or tags, or other types of pre-defined "vocal cues" and/or to jump or browse or skip directly to such tags or bookmarks, textually and/or audibly. Optionally, the generated meeting summary or presentation or transcript, may include a list of such bookmarks or tags, thereby enabling the user to see them and to skip or browse directly to the transcript-portion or audio-portion that corresponds to each such selected tag or bookmark.

In some embodiments, a meeting participant may say or utter during an ongoing meeting, a vocal cue or a vocal command such as, for example, "Hey Mia, create here a bookmark of Budget"; and at that time-point in the audio recording and in the written transcript that is generated, the system inserts a bookmark or a tag of "Budget". Such bookmark or tag may be public, such that this participant as well as other meeting participants, or even other (non-participating) users in the organization, may later query or search for "meetings that have a Budget bookmark", and the system retrieves such meetings for subsequent playback of the audio and for review of the generated transcript. Moreover, the created bookmark is added as a textual link or as a button, such that in response to click or tap or engagement on it, causes the Audio Recording to skip or to jump exactly to that particular time-point in the audio recording of the meeting, and to perform audio playback from that point onward; thereby enabling users to bookmark particular time-points within an audio recording of a meeting, such bookmarking being performed in real-time as the meeting is actually ongoing and is being recorded; and enabling the system to generate and display a visual representation of the created Bookmarks, which may be utilized later by users in order to efficiently navigate within the audio recording to a particular Bookmarked audio segment. The information about a user-created bookmark, including the particular time-point, the bookmark tag or title or content, and the identity of the user who created the bookmark, may be stored in a lookup table or an XML file or other data-set or record, which is associated with the meeting's audio recording and/or textual transcript and/or digital presentation.

It is noted that the functionalities of the present invention are much more advanced in comparison with a conventional automatic transcript unit, which merely generates a long textual transcript that can span dozens of pages for a single meeting. Rather, the system of the present invention is able to automatically generate a Smart Transcript, or a presentation or a summary, which emphasizes visually the particular bookmarks or tags or topics that were discussed, and which enable a user to navigate efficiently and rapidly to particular topics or bookmarks or tags within the meeting summary or the meeting transcript or the meeting presentation. Instead of manually searching the transcript for the word "budget", which may appear dozen of times in the transcript, the user may request the system to navigate only to the three particular bookmarks or tags within the meeting that were Actively bookmarked or tagged by the speaker as related to Budget; thereby saving time and efforts to the user.

In some embodiments, the system may be configured to enable a user to command the Moderator Bot unit, which participates in a meeting, to perform real-time actions or subsequent (post-meeting) actions, based on one or more keywords or key phrases or other vocal cues. For example, the system may be configured to recognize the phrase "Hey Mia, please do this" or the phrase "Hey Robot, please do this"; and extracts the speech that follows it immediately, and converts it to text, and then extracts a command from that text and performs the command (immediately or subsequently). For example, participant Adam may say during the meeting, "Hey Robot, please do this: open the Excel file that is attached to this meeting invitation and show it on the shared screen of this meeting"; and the Moderator Bot utilizes one or more processing methods to parse this command and to perform it (e.g., recognizing the command "open", recognizing the subject of "the Excel file that is attached", obtaining that file from the meeting invitation, and performing the opening of the file and the sharing of its display). In another example, participant Bob may say during the meeting, "Hey Mia, please do this: send project status inquiry by email to Carl on Tuesday morning"; and this command is parsed and acted upon, for example, as the system performs an automatic composing and sending of an email to Carl on Tuesday at 9 AM with content of "What is the project status?"; with a copy to participant Bob who initiated this command, and/or by sending it as a virtual assistant to participant Bob or "on behalf of" participant Bob. In some embodiments, the in-meeting command may include, for example, a commend to the Moderator Bot to obtain or search of download a file or a data-item; such as, requesting the Moderator Bot to "send by email to all participants the Revenue Forecast for 2021"; and in response, the system may search for a file that is named or tagged with "revenue" and "forecast" and "2021", and/or may obtain it from a repository or database or CRM subsystem, and may proceed to send the file via email to the email addresses of the meeting participants. In other embodiments, the in-meeting command to the Moderator Bot may be, for example, to retrieve or find such file or data-item, and to display or show it on a shared screen of the meeting; or even, to create a new data-item or file, or to modify or update an existing data-item or file (e.g., commanding the Moderator Bot to update the "revenue forecast 2021" document by changing the Sales item from 20,000 items to 35,000 items). The Moderator Bot receives such command, and the system performs parsing of the command, obtaining (or creating) the relevant files or data-items, making the requested changes or updates (if requested), and then saving the file or sending it to participants or to other recipients as requested.

It is noted that the above-mentioned functionalities go far beyond the conventional capabilities of a conventional "virtual assistant", such as Ski of Apple, or such as Alexa of Amazon. Those conventional virtual assistants are configured to operate with one speaker and not in the context of a meeting; and they are unable to participate in a meeting or an audio conference or a video conference without being physically located in a room with a participant. In contrast, the Moderator Bot Unit of the present invention is a module or unit, which may be implemented via a cloud-computing module, which monitors a combined "audio bridge" of multiple participants in an audio meeting, and analyzes the audio stream or the audio recording as an active virtual participant that takes notes, generates a summary and an agenda and a list of action items, adds bookmarks and tags, performs in-meeting actions, and performs post-meeting actions.

In some embodiments, optionally, a meeting participant may communicate with the Moderator Bot Unit using a side-channel that is hidden from other participants, and/or using a public channel that is visible to other participants; such as, a private or a public chat-bot or text-chat module. For example, while participant Adam is speaking in a meeting, participant Bob may send a text message to the Moderator Bot, with content of "Add bookmark of Budget here"; thereby commanding to the Moderator Bot to create and add such bookmark at this particular time-point; and the Moderator Bot proceeds to perform this action, even though it came from participant Bob and did not come from the current speaker Adam. In some embodiments, the command may be conveyed textually using a chat-unit that is visible to other meeting participants, or that is private and is not visible to them. In some embodiments, the system may be configured to authorize only particular participants, and not others, to provide such commands via text or via chat; or the system may be configured to act upon commands that arrive via chat or text only from certain participants and not others.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The present invention may be implemented by using hardware units, software units, processors, CPUs, DSPs, integrated circuits, memory units, storage units, wireless communication modems or transmitters or receivers or transceivers, cellular transceivers, a power source, input units, output units, Operating System (OS), drivers, applications, and/or other suitable components.

The present invention may be implemented by using a special-purpose machine or a specific-purpose that is not a generic computer, or by using a non-generic computer or a non-general computer or machine. Such system or device may utilize or may comprise one or more units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

The present invention may be implemented by using code or program code or machine-readable instructions or machine-readable code, which is stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such device to perform a method in accordance with the present invention.

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method comprising:
obtaining and monitoring audio of a meeting having multiple participants;
automatically generating an agenda of topics for said meeting, based at least on an analysis of a presentation that is associated with said meeting;
automatically allocating time-slots for discussing each topic in said meeting;
based on analysis of said audio, generating and performing a meeting steering operation with regard to said meeting, wherein the meeting steering operation comprises at least:
detecting that a particular participant in said meeting performs an interfering double-talk over another participant;
selectively generating a notification indicating to said particular participant to refrain from interfering double-talk;

subsequently, detecting that said particular participant in said meeting performs again an interfering double-talk over another participant; and in response, automatically muting audio from said particular participant for a pre-defined time-period.

2. The method of claim 1, comprising:
detecting that a particular participant in said meeting speaks at a volume level that is below a pre-defined threshold value;
selectively generating a notification indicating to said particular participant to raise his voice.

3. The method of claim 1, comprising:
automatically generating a textual or audible notification, to at least one participant in said meeting, at a particular time-point within said meeting, indicating an automated request to state an agenda of topics for said meeting.

4. The method of claim 1, comprising:
automatically generating a textual or audible notification, to at least one participant in said meeting, at a particular time-point within said meeting, indicating an automated request to state a summary of tasks allocated to users in said meeting.

5. The method of claim 1, comprising:
monitoring audio conversations in said meeting, and detecting that a particular topic on an agenda of said meeting was not yet discussed;
generating a notification during said meeting, to at least one participant of said meeting, to address said particular topic.

6. The method of claim 1, comprising:
during said meeting, automatically performing a textual analysis of audio conversations discussed so far in said meeting;
during said meeting, automatically detecting that a particular topic was skipped and was not discussed;
during said meeting, generating a notification to one or more participants, indicating that said particular topic was skipped and should be discussed.

7. The method of claim 1, comprising:
determining that a particular topic in said agenda, is relevant to a particular user that did not yet join said meeting;
during said meeting, detecting that a conversation relates to said particular topic;
during said meeting, automatically generating a notification to one or more participants, indicating that discussion of said particular topic should be postponed until said particular user joins said meeting.

8. The method of claim 1, comprising:
determining that a particular topic in said agenda, is relevant to a particular user that attended the meeting but already left the meeting;
during said meeting, detecting that a conversation relates to said particular topic;
during said meeting, automatically generating a notification to one or more participants, alerting that said particular user who already left the meeting is relevant to said particular topic that is currently discussed by remaining participants in said meeting.

9. The method of claim 1, comprising:
determining that a recent meeting-portion includes conversations about one or more topics that are not in said agenda;
automatically generating a notification to one or more participants, alerting that current conversations are about one or more topics that are not in said agenda, and steering said meeting towards a next scheduled topic on said agenda.

10. The method of claim 1, comprising:
during said meeting, automatically generating a plurality of in-meeting notifications that indicate proposals to steer the meeting in accordance with pre-defined rules;
automatically monitoring conversations in said meeting, and monitoring whether or not participants in said meeting comply with each such in-meeting notifications;
automatically generating a compliance summary report, which indicates: (i) which participants complied with in-meeting notifications, and (ii) which participants did not comply with in-meeting notifications.

11. The method of claim 1, comprising:
during said meeting, automatically generating a plurality of in-meeting notifications that indicate proposals to steer the meeting in accordance with pre-defined rules;
automatically monitoring conversations in said meeting, and monitoring whether or not participants in said meeting comply with each such in-meeting notifications;
automatically generating a compliance summary report, which indicates: (i) which in-meeting notifications were complied with, and (ii) which in-meeting notifications were not complied with.

12. The method of claim 1, comprising:
automatically recognizing a pre-defined triggering vocal cue in an audio of said meeting;
extracting a command from an audio-portion that follows said triggering vocal cue;
performing said command, wherein the command is an in-meeting command from a meeting participant to a virtual moderator bot that participates in said meeting, wherein the command instructs to obtain a data-item or to create or modify a data-item.

13. The method of claim 1, comprising:
defining a first speaker-dependent triggering vocal cue, which triggers an automated command if uttered by a first particular speaker in said meeting;
defining a second, different, speaker-dependent triggering vocal cue, which triggers same said automated command if uttered by a second, different, particular speaker in said meeting;
monitoring audio of said meeting, and automatically recognizing a pre-defined speaker-dependent triggering vocal cue;
extracting a command from an audio-portion that follows said triggering vocal cue;
automatically performing said command.

14. The method of claim 1, comprising:
automatically recognizing a pre-defined triggering vocal cue in an audio of said meeting;
generating a user-initiated bookmark that is derived from text extracted from an audio-portion that follows said triggering vocal cue;
generating an association among (i) said user-initiated bookmark, and (ii) a particular time-point in said audio of said meeting in which said vocal cue was recognized, and (iii) a particular portion of a transcript of said meeting which corresponds to said vocal cue.

15. The method of claim 14, comprising:
receiving a post-meeting user command to access a meeting-portion that corresponds to said user-initiated bookmark;

in response to said post-meeting user command, playing to said user an audio portion from said meeting which begins at said vocal cue of said user-initiated bookmark.

16. The method of claim 14, comprising:
receiving a post-meeting user command to access a meeting-portion that corresponds to said user-initiated bookmark;
in response to said post-meeting user command, displaying to said user a transcript-portion of said meeting which begins at said vocal cue of said user-initiated bookmark.

17. The method of claim 1,
wherein automatically generating the agenda comprises:
automatically generating the agenda of topics for said meeting, based cumulatively on (i) analysis of said presentation that is associated with said meeting, and also (ii) analysis of audio conversations that already occurred in said meeting, and also (iii) analysis of data or meta-data of an invitation to attend said meeting.

18. A non-transitory storage medium having stored thereon instructions that, when executed by a machine, cause the machine to perform a method comprising:
obtaining and monitoring audio of a meeting having multiple participants;
automatically generating an agenda of topics for said meeting, based at least on an analysis of a presentation that is associated with said meeting;
automatically allocating time-slots for discussing each topic in said meeting;
based on analysis of said audio, generating and performing a meeting steering operation with regard to said meeting, wherein the meeting steering operation comprises at least:
detecting that a particular participant in said meeting performs an interfering double-talk over another participant;
selectively generating a notification indicating to said particular participant to refrain from interfering double-talk;
subsequently, detecting that said particular participant in said meeting performs again an interfering double-talk over another participant; and in response, automatically muting audio from said particular participant for a pre-defined time-period.

19. A system comprising:
one or more processors that are configured to execute code,
and that are operably associated with one or more memory units that are configured to store code,
wherein the one or more processors are configured to perform a process comprising:
obtaining and monitoring audio of a meeting having multiple participants;
automatically generating an agenda of topics for said meeting, based at least on an analysis of a presentation that is associated with said meeting;
automatically allocating time-slots for discussing each topic in said meeting;
based on analysis of said audio, generating and performing a meeting steering operation with regard to said meeting, wherein the meeting steering operation comprises at least:
detecting that a particular participant in said meeting performs an interfering double-talk over another participant;
selectively generating a notification indicating to said particular participant to refrain from interfering double-talk;
subsequently, detecting that said particular participant in said meeting performs again an interfering double-talk over another participant; and in response, automatically muting audio from said particular participant for a pre-defined time-period.

\* \* \* \* \*